(12) United States Patent
Horio et al.

(10) Patent No.: US 8,243,704 B2
(45) Date of Patent: Aug. 14, 2012

(54) CALL CONTROL DEVICE, RELAY DEVICE, CALL CONTROL METHOD, AND STORAGE MEDIUM

(75) Inventors: Kenichi Horio, Kawasaki (JP); Kazuki Matsui, Kawasaki (JP); Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/620,555

(22) Filed: Nov. 17, 2009

(65) Prior Publication Data

US 2010/0128707 A1 May 27, 2010

(30) Foreign Application Priority Data

Nov. 21, 2008 (JP) ................................ 2008-298607

(51) Int. Cl.
*H04W 4/00* (2009.01)
(52) U.S. Cl. ..................... 370/338; 370/352; 370/401
(58) Field of Classification Search .................. None
See application file for complete search history.

(56) References Cited

U.S. PATENT DOCUMENTS

| | | | | |
|---|---|---|---|---|
| 6,526,041 B1 * | 2/2003 | Shaffer et al. | ................. | 370/352 |
| 2006/0280187 A1 * | 12/2006 | Fukushima et al. | ..... | 370/395.52 |
| 2007/0019572 A1 * | 1/2007 | Yoshida et al. | ................ | 370/261 |
| 2008/0139228 A1 * | 6/2008 | Raffel et al. | ................... | 455/466 |
| 2008/0160961 A1 * | 7/2008 | Mizuma et al. | ................ | 455/411 |

FOREIGN PATENT DOCUMENTS

| | | |
|---|---|---|
| JP | 2002-165017 | 6/2002 |
| JP | 2006-180372 | 7/2006 |
| JP | 2006-285801 | 10/2006 |
| JP | 2006-345252 | 12/2006 |
| JP | 2007-20000 | 1/2007 |
| JP | 2008-167021 | 7/2008 |

* cited by examiner

*Primary Examiner* — Robert Scheibel
(74) *Attorney, Agent, or Firm* — Fujitsu Patent Center

(57) ABSTRACT

A call control device, which controls call connections between a plurality of terminals, includes a device information storage unit that stores device information on call-connectable terminals; a call request accepting unit that accepts a call request from one terminal to another terminal; a determining unit that determines, when the call request accepting unit accepts a call request, whether the device information on the other terminal is stored in the device information storage unit; a holding unit that holds a call state of the one terminal when the determining unit determines that device information on the other terminal is not stored in the device information storage unit; a state acquiring unit that acquires state information indicating a state of the other terminal; and a holding tone setting unit that sets a holding tone to be transmitted to the one terminal associated with the state information acquired by the state acquiring unit.

9 Claims, 28 Drawing Sheets

FIG. 3A

| SIP-URI | IP ADDRESS |
|---|---|
| terminal10@sip.com | 192.168.1.10 |
| terminal11@sip.com | 192.168.1.110 |
| terminal12@sip.com | 192.168.10.1 |
| ⋮ | ⋮ |

| NUMBER | SIP-URI | TELEPHONE NUMBER |
|---|---|---|
| 1 | terminal1@sip.com | 03-1234-5678 |
| 2 | terminal3@sip.com | 03-2345-6789 |
| 3 | terminal5@sip.com | 03-3456-7890 |

| NUMBER | CALL ID | CALLING PARTY URI | CALLED PARTY URI | CALL STATE | ELAPSED TIME (SECONDS) |
|---|---|---|---|---|---|
| 1 | 00000001@terminal1 | terminal1@sip.com | terminal2@sip.com | IP CONNECTING | 5 |
| 2 | 00000011@terminal3 | terminal3@sip.com | terminal4@sip.com | IP CONNECTING | 15 |
| 3 | 00000111@terminal5 | terminal5@sip.com | terminal6@sip.com | CALLING | 25 |

13b

CALL CONTROL DEVICE, RELAY DEVICE, CALL CONTROL METHOD, AND STORAGE MEDIUM

CROSS-REFERENCE TO RELATED APPLICATIONS

This application is based upon and claims the benefit of priority of the prior Japanese Patent Application No. 2008-298607, filed on Nov. 21, 2008, the entire contents of which are incorporated herein by reference.

FIELD

The embodiments relates to a call control device that controls call connections between terminal devices, a relay device that relays calls between networks, a call control method used by the call control device, and a storage medium storing a computer program for operating the call control device with a computer.

BACKGROUND

There is an increase in the use of VoIP (Voice over Internet Protocol), VoPN (Voice over Packet Network), applications such as streaming, and the like for transmitting and receiving audio and visual data between devices via a communication network such as an IP (Internet Protocol) network. As an example of such an application, IP telephones that are capable of transmitting and receiving packets via an IP network are rapidly becoming widespread.

An IP telephone converts, for example, an analog audio signal based on the speech of a user into a digital signal, packetizes the audio signal converted into the digital signal, and transmits and receives the packetized audio signal to and from an IP telephone of a communication partner via an IP network. Therefore, in order to initiate communication between IP telephones, the IP address of the IP telephone of a communication partner (called party) must be identified when the IP telephone of the calling party initiates a call. Recently, a standard configuration of an IP telephone system involves the use of an SIP (Session Initiation Protocol) server in order to identify the IP address of a called IP telephone.

With a system using an SIP server, upon activation, each IP telephone registers, in the SIP server, an IP address assigned to itself. When initiating a call, an IP telephone then asks the SIP server about the IP address of an IP telephone of the communication partner (called party). In response to the inquiry from the calling IP telephone, the SIP server identifies the IP address of the called IP telephone, and using the identified IP address, notifies the called IP telephone to expect an incoming call. When there is a response to the notification from the called IP telephone, the SIP server establishes a call connection between the calling IP telephone and the called IP telephone. Consequently, IP communication (call) is initiated between the calling IP telephone and the called IP telephone.

Meanwhile, for the purpose of using IP telephones without being restricted by the point of use, there is a demand for the realization of an IP telephone service over a mobile communication network such as a FOMA (registered trademark) network which can be used over a wide area. However, with existing mobile communication networks (so-called 3G networks), always-on IP connections of IP terminals (IP telephones) are not allowed due to restrictions in address resources. Therefore, each IP telephone is required to temporarily establish an IP connection as necessary, and utilize applications such as a Web browser or e-mail using a dynamically assigned IP address.

In such circumstances, since an IP address cannot be constantly assigned to all IP telephones, the IP addresses of all IP telephones cannot be registered in an SIP server. When an IP telephone whose IP address is not registered receives an incoming call, the SIP server returns an error to the calling IP telephone. Consequently, there are situations where communication with an IP telephone whose IP address is not registered in the SIP server cannot be performed.

In consideration thereof, an SIP server is proposed which, when an IP telephone with an unregistered IP address receives an incoming call, notifies the called IP telephone to expect an incoming call using an SMS (Short Message Service) on a switched telephone network instead of returning an error to the calling IP telephone (refer to Patent Documents 1 and 2). When an SMS notification is received, the called IP telephone establishes an IP connection to a mobile communication network to acquire an IP address, and registers the acquired IP address to the SIP server that made the notification regarding the incoming call.

Upon confirming the registration of an IP address of the called IP telephone, the SIP server uses the registered IP address to once again notify the called IP telephone to expect an incoming call. When there is a response to the notification from the called IP telephone, the SIP server establishes a call connection between the calling IP telephone and the called IP telephone. Such a technique enables IP communication (call) between IP telephones via a mobile communication network regardless of whether or not an IP address is registered in the SIP server. Examples of such a technique include, for example, Japanese Patent Laid-Open No. 2007-20000 and Japanese Patent Laid-Open No. 2006-180372.

SUMMARY

An aspect of the present invention relates to a call control device which controls call connections between a plurality of terminal devices. The call control device includes a device information storage unit that stores device information on call-connectable terminal devices; a call request accepting unit that accepts a call request from one terminal device to another terminal device; a determining unit that determines, when the call request accepting unit accepts a call request, whether the device information on the other terminal device is stored in the device information storage unit; a holding unit that holds a call state of the one terminal device when the determining unit determines that device information on the other terminal device is not stored in the device information storage unit; a state acquiring unit that acquires state information indicating a state of the other terminal device; and a holding tone setting unit that sets a holding tone to be transmitted to the one terminal device in accordance with the state information acquired by the state acquiring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates stored contents of a registered information table;

FIG. 3B illustrates stored contents of a number management table;

FIG. 4 illustrates stored contents of an unregistered terminal management table;

DESCRIPTION OF EMBODIMENTS

In an IP telephone system, an SIP server notifies a calling IP telephone for the first time that a called IP telephone is being called when notifying the called IP telephone via a mobile communication network that an incoming call is to be expected. When notified by the SIP server that the called IP telephone is being called, the calling IP telephone outputs a ringing tone. In other words, after sending a call (calling) to the called IP telephone, the calling IP telephone does not perform anything until notified by the SIP server that the called IP telephone is being called and outputting the ringing tone.

Therefore, when sending a call to an IP telephone whose IP address is not registered in the SIP server, the calling IP telephone does not perform anything until: the SIP server notifies the called IP telephone using SMS that an incoming call is to be expected; the called IP telephone establishes an IP connection to the mobile communication network and registers an acquired IP address in the SIP server; the SIP server once again notifies the called IP telephone that an incoming call is to be expected; and the SIP server notifies the calling IP telephone that the called IP telephone is being called.

Therefore, the calling user must wait after calling from the user's own IP telephone until a ringing tone is outputted. In particular, when a call is sent to an IP telephone whose IP address is not registered in the SIP server, it is possible that the user will be forced to wait for a long time (several tens of seconds). Furthermore, while waiting, the calling user has no way of knowing the state of the communication partner IP telephone, including whether the called IP telephone is currently establishing a communication channel, whether the called IP telephone is currently powered off, whether the called IP telephone is currently experiencing some kind of failure, or the like. Therefore, since the calling user has no way of knowing how long to wait, the calling user is unable to determine whether to wait until the communication partner picks up the phone or to give up trying to make a connection. Such situations can be very inconvenient to the calling user.

In the following embodiments, a call control device, a relay device, a call control method, and a computer program are provided which enable a user making a call using a terminal device to know the state of a terminal device of a communication partner even before a connection with the terminal device of the communication partner is established.

Hereinafter, a call control device, a relay device, a call control method, and a computer program disclosed in the present application will be described in detail with reference to drawings illustrating various embodiments in which the present application is applied to an IP telephone system.

FIRST EMBODIMENT

Figure 1:
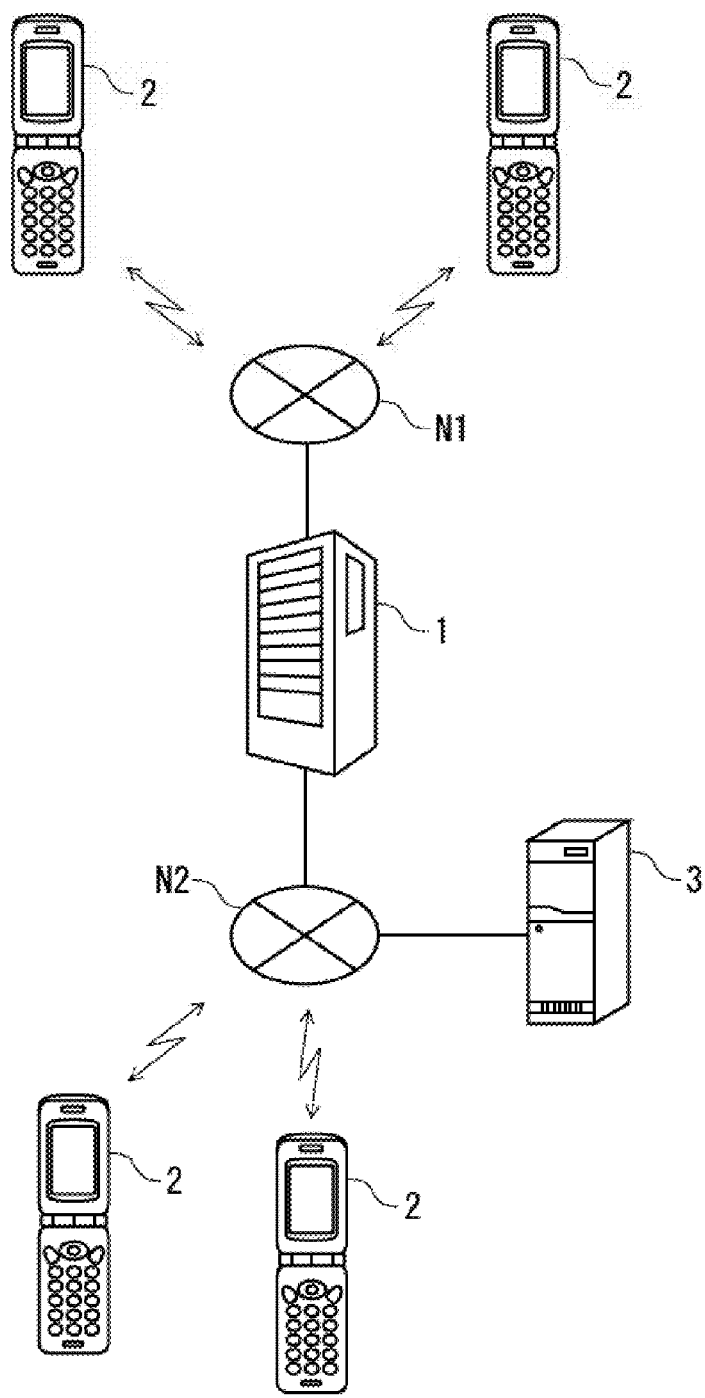
FIG. 1 illustrates a configuration of an IP telephone system according to a first embodiment.

Hereinafter, an IP telephone system according to a first embodiment will be described. FIG. 1 illustrates a configuration of an IP telephone system according to the first embodiment. The IP telephone system according to the present first embodiment includes: a communication network N1 that is, for example, a corporate LAN (Local Area Network) constructed within a company or an office; and a communication network N2 such as a mobile communication network including the Internet. The communication network N1 supports communication using a packet exchange method. The communication network N2 supports both communication using a line exchange method and communication using a packet exchange method.

The IP telephone system according to the present first embodiment includes: an SIP server 1 connected to both the communication network N1 and the communication network N2; an SMS (Short Message Service) server 3 connected to the communication network N2; and terminal devices 2 that communicate with other terminal devices 2 via the communication network N1 and/or the communication network N2. The SIP server 1 is a call control device disclosed in the present application and controls call connections between the terminals 2 via IP networks such as the communication network N1 and the communication network N2. The SMS server 3 is a general SMS gateway server and includes a function for transmitting messages via line exchange communication.

When the terminal device 2 is located in a range in which the communication network N1 may be used, the terminal device 2 performs packet exchange communication with the SIP server 1 via the communication network N1. When the terminal device 2 is not located in a range in which the communication network N1 may be used, the terminal device 2 performs packet exchange communication with the SIP server 1 via the communication network N2. The SIP server 1 and the SMS server 3 perform packet exchange communication via the communication network N2. In addition, the SMS server 3 performs line exchange communication between the terminal devices 2 via the communication network N2.

Hereinafter, a description will be given on processing respectively performed by the SIP server 1, the SMS server 3, a calling party terminal device 2, and a called party terminal device 2 when a terminal device 2 located within a range in which the communication network N1 may be used sends a call (performs calling) to another terminal device 2. Moreover, the calling party terminal device 2 shall be referred to as the calling terminal 2 and the called party terminal device 2 as the called terminal 2.

Configurations of the SIP server 1 and the terminal device 2 according to the present first embodiment will now be described in detail. Since the SMS server 3 is a general SMS gateway server, a description thereof shall be omitted.

Figure 2:
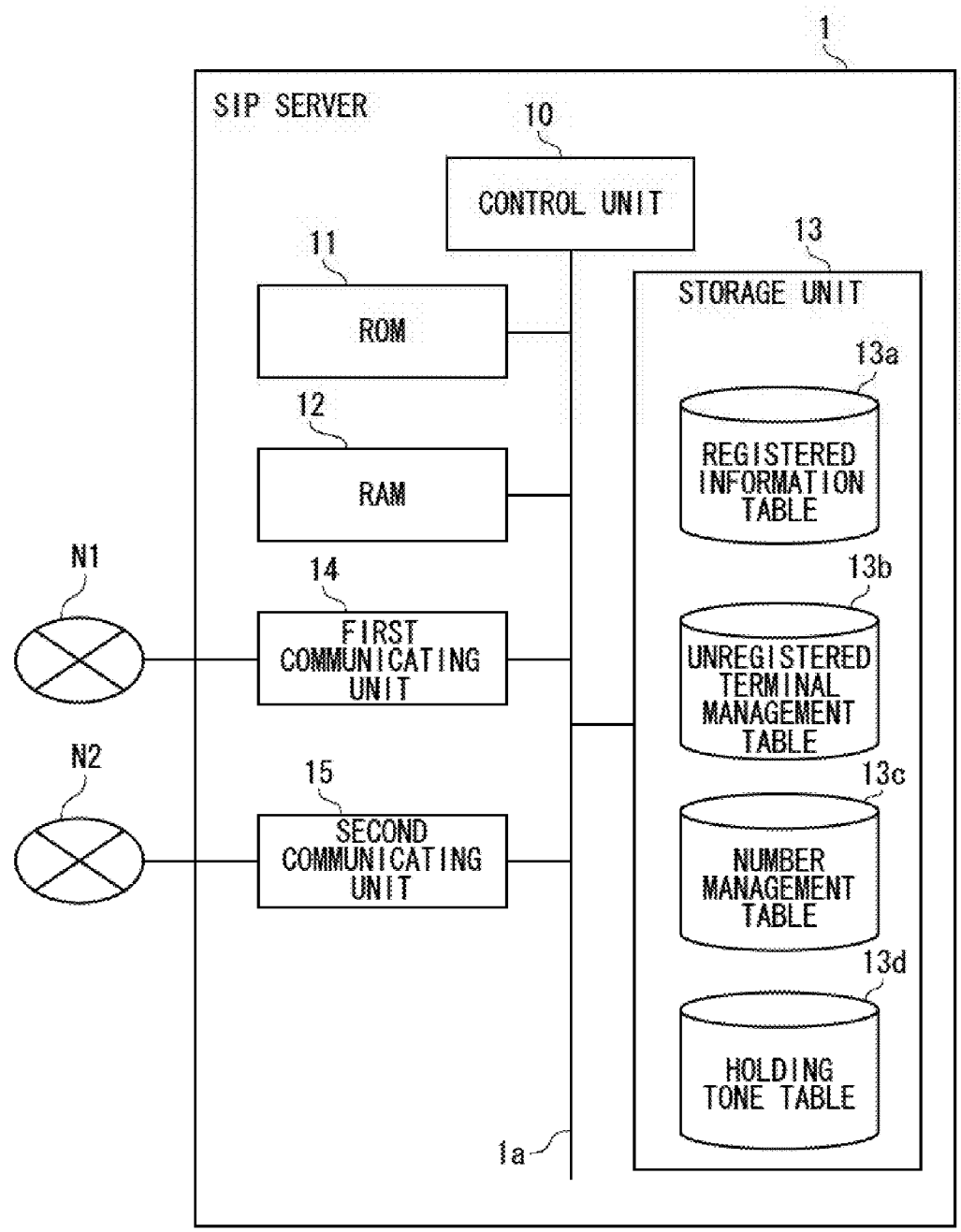
FIG. 2 illustrates a configuration of an SIP server according to the first embodiment.

FIG. 2 illustrates a configuration of the SIP server 1 according to the first embodiment. The SIP server 1 according to the present first embodiment includes a control unit 10, a ROM (Read Only Memory) 11, a RAM (Random Access Memory) 12, a storage unit 13, a first communicating unit 14, a second communicating unit 15, and the like. The respective hardware units are mutually connected via a bus 1a.

The SIP server 1 according to the present first embodiment stores the computer program disclosed in the present application in the ROM 11 or the storage unit 13, and realizes operations of the call control device disclosed in the present application when the computer program is executed by the control unit 10. The computer program disclosed in the present application is not limited to a configuration in which the computer program is stored in advance in the storage unit 13. For example, when the SIP server 1 is capable of accessing an external memory, the SIP server 1 may read the computer program stored in the external memory and store the same in the storage unit 13. Alternatively, the SIP server 1 may download the computer program from an external device and store the same in the storage unit 13.

The control unit 10 is a CPU (Central Processing Unit), an MPU (Micro Processing Unit), or the like, and includes a clock that measures absolute time (year, month, day, hour, minute, second). At a specific timing based on the time indicated by the clock, the control unit 10 reads out a control program stored in advance in the ROM 11 or the storage unit 13 to the RAM 12 and executes the same. In addition, the control unit 10 controls operations of the respective hardware units described above. The ROM 11 stores, in advance, various control programs for causing the SIP server 1 to operate as a call control device disclosed in the present application. The RAM 12 is an SRAM, a flash memory, or the like, and temporarily stores various data generated when the control program is executed by the control unit 10.

The storage unit 13 is a large-capacity storage device such as a hard disk drive. The storage unit 13 stores, in advance, various control programs for causing the SIP server 1 to operate as a call control device disclosed in the present application. In addition, the storage unit 13 includes a registered information table 13a, an unregistered terminal management table 13b, a number management table 13c, a holding tone table 13d, and the like.

The first communicating unit 14 is an interface for connecting to the communication network N1, and pursuant to an instruction from the control unit 10, performs packet exchange communication with the terminal device 2 via the communication network N1. The second communicating unit 15 is an interface for connecting to the communication network N2, and pursuant to an instruction from the control unit 10, performs packet exchange communication or line exchange communication between the terminal device 2 and the SMS server 3 via the communication network N2.

FIG. 3A illustrates stored contents of the registered information table 13a. FIG. 3B illustrates stored contents of the number management table 13c. As illustrated in FIG. 3A, as device information of terminal devices (called terminals) 2 that may be call-connected when a call request is made, the registered information table (device information storage unit) 13a stores an SIP-URI (Uniform Resource Identifier), an IP address, and the like in correspondence with each terminal device (called terminal) 2.

An SIP-URI is information for identifying each terminal device 2 and is included in a "To" header or a "From" header of a transmitted and/or received SIP message. An IP address is information that is assigned when the terminal device 2 uses the communication network N1 or the communication network N2. Stored contents of the registered information table 13a are stored by the control unit 10 when each terminal device 2 notifies the use of the communication network N1 or the communication network N2 to the SIP server 1 (SIP registration request).

As illustrated in FIG. 3B, the number management table 13c stores, for each terminal device 2 that may potentially perform communication via the SIP server 1, a number, an SIP-URI, a telephone number, and the like in correspondence with the terminal device 2. The telephone number is a telephone number to be used over a line exchange network of the communication network N2 and is used as a transmission destination of an SMS message. Stored contents of the number management table 13c are stored or deleted by the control unit 10 in response to the input of information by an administrator of the IP telephone system when a terminal device 2 that performs communication via the SIP server 1 is added or discarded.

FIG. 4 illustrates stored contents of the unregistered terminal management table 13b. As illustrated in FIG. 4, the unregistered terminal management table 13b stores, for each call (session), a number, a call ID, a calling party URI, a called party URI, a call state, an elapsed time, and the like in correspondence with the call (session). Stored contents of the unregistered terminal management table 13b are stored by the control unit 10 when a call request (incoming call) is made to a terminal device 2 whose IP address is not registered in the registered information table 13a. In addition, the stored contents of the unregistered terminal management table 13b are deleted by the control unit 10 when communication between the calling terminal 2 and the called terminal 2 starts or upon confirmation of a communication failure.

A call ID is identification information that is attached to each call (session) and is a Call-ID header of each received packet (SIP INVITE). For example, a dialog ID (a combination of a Call-ID header and a tag of a "To" header or a "From" header) as defined in RFC 3261 may be used as a call ID. A calling party URI is the SIP-URI of the calling terminal 2 and a called party URI is the SIP-URI of the called terminal 2. A call state is information indicating the state of the called terminal 2 in regards to each call (session). An elapsed time indicates the time elapsed from the moment each piece of information is stored in the unregistered terminal management table 13b. In other words, an elapsed time indicates the time elapsed from the moment a call request from the calling terminal 2 is accepted.

In the present first embodiment, the following call states are to be stored in the unregistered terminal management table 13b: "IP connecting" and "Calling". "IP-connecting"

indicates that the SIP server 1 has already notified a terminal device (called terminal) 2 whose IP address is not registered in the registered information table 13*a* that a call request has been accepted. "Calling" indicates that an SIP registration request (REGISTER) that notifies the SIP server 1 of the use of the communication network N1 or the communication network N2 has already been received from the called terminal 2. Moreover, information indicating call states need not be limited to the above and, for example, "SMS transmitting" may be used in place of "IP connecting", and "IP connection completed", "Call being connected", or the like may be used in place of "Calling".

Although not shown, the holding tone table 13*d* stores, in correspondence with each holding tone, an identification number for identifying the holding tone and holding tone data for recreating the holding tone. Holding tone data is stored in the holding tone table 13*d* in a format that is outputtable by the terminal device 2.

Figure 5:
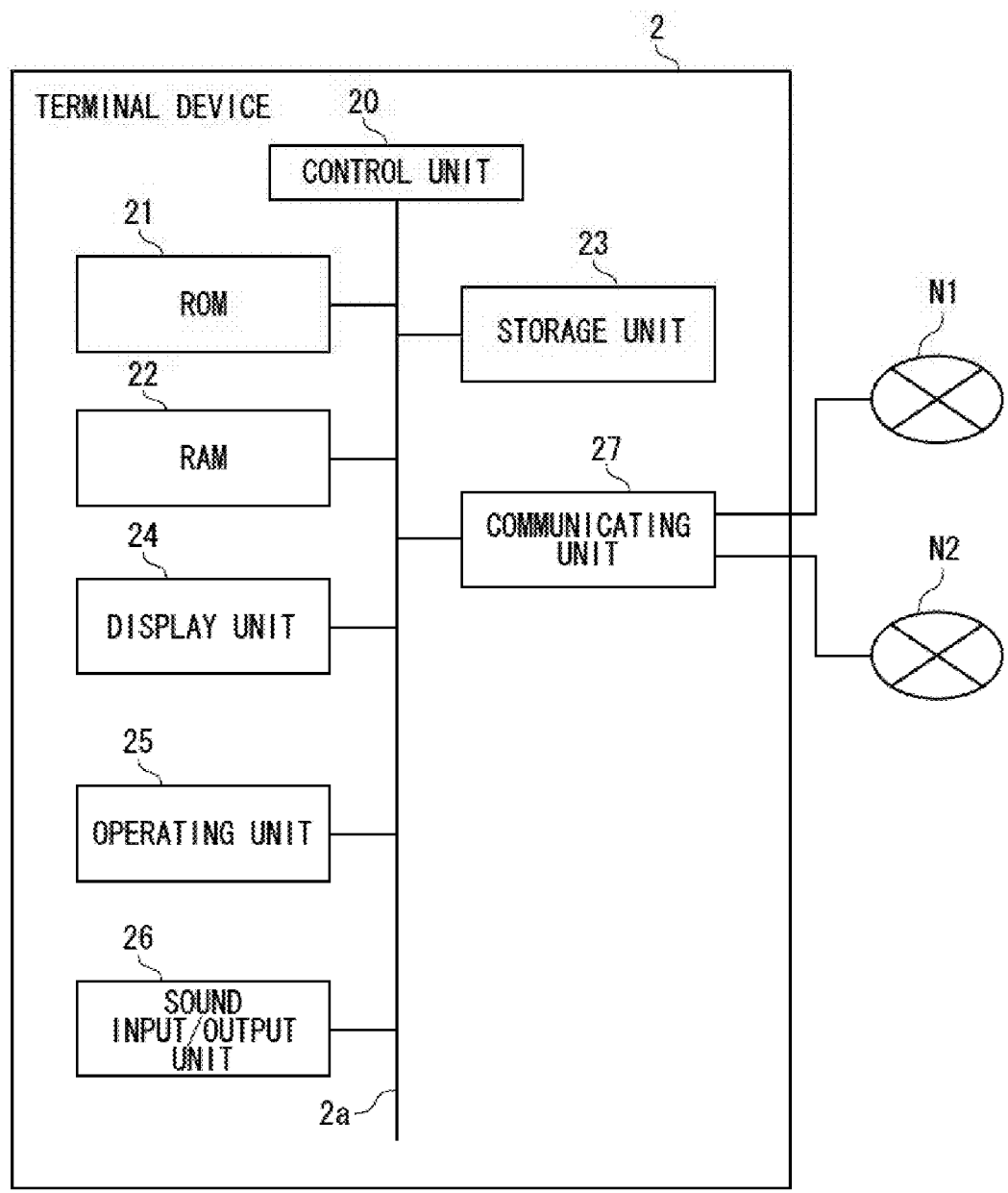
FIG. 5 illustrates a configuration of a terminal device according to the first embodiment.

FIG. 5 illustrates a configuration of the terminal device 2 according to the first embodiment. The terminal device 2 according to the present first embodiment includes a control unit 20, a ROM 21, a RAM 22, a storage unit 23, a display unit 24, an operating unit 25, a sound input/output unit 26, a communicating unit 27, and the like. The respective hardware units are mutually connected via a bus 2*a*.

The control unit 20 is a CPU, an MPU, or the like, and at a specific timing, reads out a control program stored in advance in the ROM 21 or the storage unit 23 to the RAM 22 and executes the same. In addition, the control unit 20 controls the operations of the respective hardware units described above. The ROM 21 stores, in advance, various control programs required by the terminal device 2 to perform operations. The RAM 22 is an SRAM, a flash memory, or the like, and temporarily stores various data generated when the control program is executed by the control unit 20.

The storage unit 23 is, for example, a flash memory. The storage unit 23 stores, in advance, various control programs required by the terminal device 2 to perform operations. The ROM 21 or the storage unit 23 also stores, as device information regarding its own terminal device 2, a telephone number, an SIP-URI, and the like of the terminal device 2.

The display unit 24 is, for example, a liquid crystal display (LCD), and pursuant to an instruction from the control unit 20, displays an operational state of the terminal device 2, information inputted via the operating unit 25, information to be notified to an owner (user), and the like.

The operating unit 25 includes various operating keys for the owner (user) to operate the terminal device 2. When each operating key is operated by the user, the operating unit 25 sends out a control signal corresponding to the operated operating key to the control unit 20, whereby the control unit 20 executes processing corresponding to the acquired control signal.

The sound input/output unit 26 has a sound circuit unit including an A/D converter and a D/A converter, a microphone, a speaker (all of which are not shown), and the like. The microphone collects audio spoken by the user when the terminal device 2 is used as a telephone. The speaker outputs a ring tone and the sound of the call from the calling party (communication partner) when the terminal device 2 is used as a telephone.

The audio circuit unit performs A/D conversion on an analog audio signal collected by the microphone to generate a digital audio signal, and sends out the obtained digital audio signal to the communicating unit 27. In addition, the audio circuit unit performs D/A conversion on a digital audio signal received by the communicating unit 27 from the terminal device 2 of the communication partner to generate an analog audio signal, and causes the speaker to output the sound of the call based on the obtained audio signal.

The communicating unit 27 is an interface for connecting to the communication network N1 and the communication network N2, and pursuant to an instruction from the control unit 20, communicates with the SIP server 1, the SMS server 3, and the terminal device 2 of the communication partner via the communication network N1 or the communication network N2. The communicating unit 27 performs packet exchange communication via the communication network N1 and performs packet exchange communication and line exchange communication via the communication network N2.

The communicating unit 27 converts an audio packet received from the communication network N1 or the communication network N2 into a digital audio signal, and sends out the obtained digital audio signal to the sound input/output unit 26. In addition, the communicating unit 27 converts a digital audio signal sent out from the sound input/output unit 26 into an audio packet, and transmits the obtained audio packet to the terminal device 2 of the communication partner.

Due to the configuration described above, the terminal device 2 is capable of communicating with the terminal device 2 of the communication partner via the communication network N1 and/or the communication network N2. Moreover, in addition to audio packets, the terminal device 2 is capable of transmitting and receiving visual packets generated by converting video signals, data packets generated by converting data signals, and the like.

Figure 6:
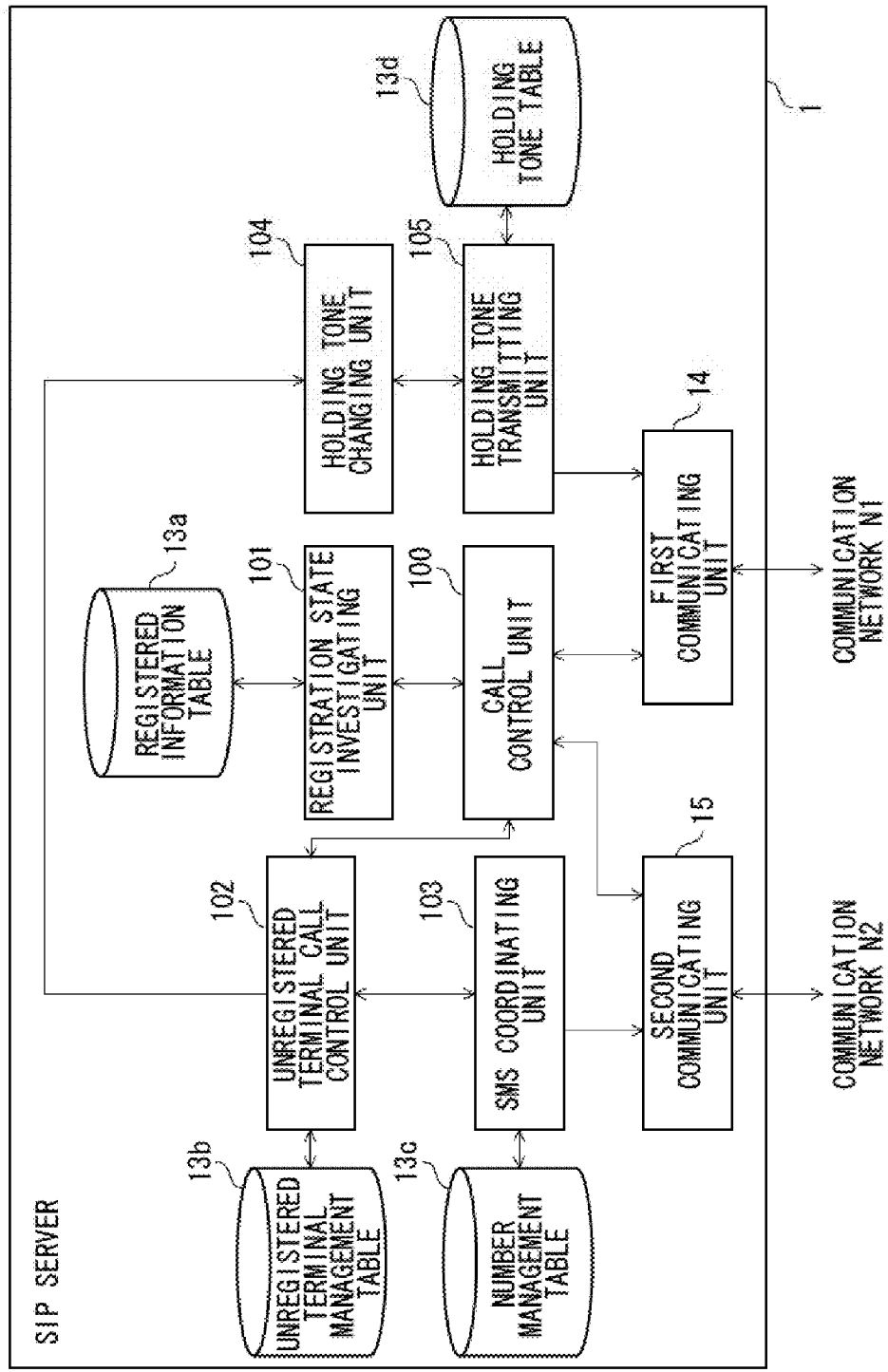
FIG. 6 illustrates a functional configuration of the SIP server according to the first embodiment.

Hereinafter, in the IP telephone system, functions realized by the control unit 10 of the SIP server 1 by executing a control program stored in the ROM 11 or the storage unit 13 will be described. FIG. 6 illustrates a functional configuration of the SIP server 1 according to the first embodiment.

With the SIP server 1 according to the present first embodiment, by executing a control program stored in the ROM 11 or the storage unit 13, the control unit 10 realizes the functions of: a call control unit 100, a registration state investigating unit 101, an unregistered terminal call control unit 102, an SMS coordinating unit 103, a holding tone changing unit 104, a holding tone transmitting unit 105, and the like.

The call control unit 100 performs processing such as transmitting and receiving call control messages (SIP), managing the call state of each SIP, and the like respectively via the first communicating unit 14 and the second communicating unit 15. When the calling terminal 2 makes a call via the communication network N1 or the communication network N2, the call control unit (call request accepting unit) 100 of the SIP server 1 receives a call request (INVITE) from the calling terminal 2 via the first communicating unit 14 or the second communicating unit 15. The call control unit 100 acquires an SIP-URI of the called terminal 2 from the received call request, and sends out the acquired SIP-URI to the registration state investigating unit 101.

The registration state investigating unit (determining unit) 101 searches the stored contents of the registered information table 13*a*, and determines whether or not an IP address corresponding to the SIP-URI acquired from the call control unit 100 is stored in the registered information table 13*a*. When an IP address corresponding to the SIP-URI acquired from the call control unit 100 is stored in the registered information table 13*a*, the registration state investigating unit 101 reads out an IP address stored in the registered information table 13*a* in correspondence with the SIP-URI or, in other words, the IP address of the called terminal 2, and notifies the same to the call control unit 100. When an IP address corresponding to the SIP-URI acquired from the call control unit 100 is not stored in the registered information table 13a, the registration state investigating unit 101 notifies the call control unit 100 that the SIP-URI of the called terminal 2 is not registered in the registered information table 13a.

When the IP address of the called terminal 2 is acquired from the registration state investigating unit 101, based on the IP address, the call control unit 100 transfers a call request (INVITE) received from the calling terminal 2 to the called terminal 2 via the communication network N1 or the communication network N2. When a successful response (a response such as "200 OK") is made from the called terminal 2 having transmitted the call request, the call control unit 100 transmits the response to the calling terminal 2 and establishes a connection between the calling terminal 2 and the called terminal 2 (a normal call establishing sequence by SIP).

On the other hand, when notified by the registration state investigating unit 101 that the SIP-URI of the called terminal 2 is not registered in the registered information table 13a, the call control unit 100 acquires a call ID, the SIP-URI of the calling terminal 2, and the SIP-URI of the called terminal 2 from the call request (INVITE) received from the calling terminal 2. The call control unit 100 sends out the acquired call ID, the SIP-URI of the calling terminal 2, and the SIP-URI of the called terminal 2 to the unregistered terminal call control unit 102.

Upon acquiring the call ID, the SIP-URI of the calling terminal 2, and the SIP-URI of the called terminal 2 from the call control unit 100, the unregistered terminal call control unit 102 sends out the acquired SIP-URI of the called terminal 2 to the SMS coordinating unit 103.

The SMS coordinating unit 103 searches among stored contents of the number management table 13c, and determines whether or not the SIP-URI acquired from the unregistered terminal call control unit 102 is stored in the number management table 13c. If the SIP-URI acquired from the unregistered terminal call control unit 102 is stored in the number management table 13c, the SMS coordinating unit 103 reads out a telephone number stored in the number management table 13c in correspondence with the SIP-URI or, in other words, the telephone number of the called terminal 2 on the communication network N2.

The SMS coordinating unit (notifying unit) 103 makes a request to the SMS server 3 to transmit an SMS message to the called terminal 2 with the telephone number read out from the number management table 13c notifying that a call request has been made. The SMS coordinating unit 103 then notifies the unregistered terminal call control unit 102 that a request for an SMS message transmission to the called terminal 2 has been made.

Pursuant to the request from the SMS coordinating unit 103 and setting the telephone number notified by the SMS coordinating unit 103 as the forwarding destination, the SMS server 3 transmits an SMS message notifying the called terminal 2 that a call request has been made. Moreover, methods for notifying the called terminal 2 that a call request has been made need not be limited to an SMS message as long as a communication channel other than an IP network such as the communication network N2 is used. For example, in the case of a WiMAX (Worldwide Interoperability for Microwave Access) standard terminal device 2, a paging function may be used.

When notified by the SMS coordinating unit 103 that a request for transmitting an SMS message to the called terminal 2 has been made, the unregistered terminal call control unit 102 assigns a number (a table management ID) to the session to the called terminal 2. Due to the notification from the SMS coordinating unit 103, the unregistered terminal call control unit (state acquiring unit) 102 is able to know that the called terminal 2 is being transmitted an SMS message and is about to establish an IP connection. The unregistered terminal call control unit 102 associates the assigned number with the call ID acquired from the call control unit 100, the SIP-URI of the calling terminal 2, and the SIP-URI of the called terminal 2 and causes the unregistered terminal management table (state storage unit) 13b to store the same. At this point, the unregistered terminal call control unit 102 causes the unregistered terminal management table 13b to store "IP connecting" as the call state of the current session.

In addition, the unregistered terminal call control unit 102 causes the unregistered terminal management table 13b to store "0" as the elapsed time of the current session. Every time a specific period of time (e.g., 5 seconds) lapses, the unregistered terminal call control unit 102 adds the specific period of time to the elapsed time of each session stored in the unregistered terminal management table 13b. Accordingly, the elapsed time from the moment information on each session is stored in the unregistered terminal management table 13b may be managed.

After the unregistered terminal call control unit 102 stores the information described above in the unregistered terminal management table 13b, the call control unit (holding unit) 100 holds the call state of the calling terminal 2. After transmitting a successful response (200 OK) to the calling terminal 2 and establishing a call connection between the calling terminal 2, the call control unit 100 transmits a hold request (Re-INVITE) to the calling terminal 2 to hold the call state between the calling terminal 2.

In addition, the unregistered terminal call control unit 102 instructs the holding tone changing unit 104 to change the holding tone data to be transmitted by the call control unit 100 to the calling terminal 2 that is on hold to holding tone data corresponding to the "IP connecting" call state. Pursuant to the instruction from the unregistered terminal call control unit 102, the holding tone changing unit (holding tone setting unit) 104 sets the holding tone data to be transmitted by the holding tone transmitting unit 105 to the calling terminal 2 to holding tone data corresponding to the "IP connecting" call state.

The holding tone transmitting unit 105 reads out holding tone data set by the holding tone changing unit 104 from the holding tone table 13d, and transmits the same as RTP data to the corresponding called terminal 2. As for the holding tone data corresponding to the "IP connecting" call state, audio data or music data that enables the user of the calling terminal 2 to know that the called terminal 2 is in an "IP connecting" state may suffice. For example, an audio message such as "IP connecting" may be used.

On the other hand, if the SIP-URI acquired from the unregistered terminal call control unit 102 is not stored in the number management table 13c, the SMS coordinating unit 103 notifies an occurrence of an error to the unregistered terminal call control unit 102. When an error occurrence is notified by the SMS coordinating unit 103, the unregistered terminal call control unit 102 notifies the call control unit 100 of the error occurrence together with the SIP-URI of the calling terminal 2 of the session on which the error occurrence has been notified.

When an error occurrence is notified by the unregistered terminal call control unit 102 together with the SIP-URI of the calling terminal 2, the call control unit 100 transmits an error response ("404 Not Found" or the like) to the calling terminal 2 and terminates the communication with the calling terminal 2.

Meanwhile, when the terminal devices 2 notify the use of the communication network N1 or the communication network N2 to the SIP server 1, the call control unit 100 receives an SIP registration request (REGISTER) via the first communicating unit 14 or the second communicating unit 15. By receiving an SIP registration request from the called terminal 2, the call control unit (state acquiring unit) 100 is able to acquire, from the called terminal 2, state information indicating that the called terminal 2 is currently requesting registration to the SIP server 1.

Upon receiving an SIP registration request, the call control unit (device information acquiring unit) 100 acquires an SIP-URI (device information) of the terminal device 2 that had made the SIP registration request from the received SIP registration request, and sends out the acquired SIP-URI to the unregistered terminal call control unit 102.

The unregistered terminal call control unit 102 searches among stored contents of the unregistered terminal management table 13b, and determines whether or not the SIP-URI acquired from the call control unit 100 is stored in a called party URI field of the unregistered terminal management table 13b. The absence of the SIP-URI acquired from the call control unit 100 from the called party URI field of the unregistered terminal management table 13b means that the SIP registration request is a normal SIP registration request. Accordingly, the unregistered terminal call control unit 102 notifies the call control unit 100 as such.

When notified by the unregistered terminal call control unit 102 that the acquired SIP-URI is not stored in the called party URI field of the unregistered terminal management table 13b, the call control unit 100 acquires, from the received SIP registration request, the SIP-URI and the IP address of the terminal device 2 that made the SIP registration request. The call control unit 100 associates the acquired SIP-URI and IP address, and causes the registered information table 13a to store the same.

On the other hand, if the SIP-URI acquired from the call control unit 100 is stored in the called party URI field of the unregistered terminal management table 13b, the unregistered terminal call control unit (adequacy judging unit) 102 determines whether or not the call state stored in the unregistered terminal management table 13b in correspondence with the SIP-URI is "IP connecting". Accordingly, the unregistered terminal call control unit 102 judges whether the terminal device 2 whose SIP-URI has been acquired from the call control unit 100 is able to make a transition in an appropriate manner from the call state already stored in the unregistered terminal management table 13b to the new call state.

If the corresponding call state is not "IP connecting", the SIP registration request is judged to be a normal SIP registration request and the unregistered terminal call control unit 102 notifies the call control unit 100 as such. In this case also, the call control unit 100 acquires, from the received SIP registration request, the SIP-URI and the IP address of the terminal device 2 that made the SIP registration request, associates the acquired SIP-URI with the IP address, and causes the registered information table 13a to store the same.

When the corresponding call state is "IP connecting", the unregistered terminal call control unit (updating unit) 102 updates the call state stored in the unregistered terminal management table 13b in correspondence with the SIP-URI acquired from the call control unit 100 to "Calling". At this point, the unregistered terminal call control unit 102 notifies the call control unit 100 that the terminal device 2 with the SIP-URI acquired from the call control unit 100 is expecting an incoming call. When the corresponding call state is "IP connecting", the terminal device 2 whose SIP-URI has been acquired from the call control unit 100 is able to make a transition in an appropriate manner from the call state already stored in the unregistered terminal management table 13b to the new call state.

When notified by the unregistered terminal call control unit 102 that the terminal device 2 that made the SIP registration request is expecting an incoming call, the call control unit 100 acquires, from the received SIP registration request, the SIP-URI and the IP address of the terminal device 2 that made the SIP registration request. The call control unit (storage control unit) 100 associates the acquired SIP-URI with the IP address, and causes the registered information table 13a to store the same. The call control unit (calling unit) 100 then transmits a call request (INVITE) to the called terminal 2 and performs call processing (call transfer initiation).

Moreover, after updating the unregistered terminal management table 13b, the unregistered terminal call control unit 102 instructs the holding tone changing unit 104 to change the holding tone data to be transmitted by the call control unit 100 to the calling terminal 2 that is on hold to holding tone data corresponding to the "Calling" call state. Accordingly, holding tone data corresponding to the "Calling" call state is transmitted from the holding tone transmitting unit 105 to the calling terminal 2. As for the holding tone data corresponding to the "Calling" call state, audio data or music data that enables the user of the calling terminal 2 to know that the called terminal 2 is in a "Calling" state may suffice. For example, an audio message such as "Calling" may be used.

When the called terminal 2 having received the call request (INVITE) transmitted by the SIP server 1 transmits a successful response (200 OK) to the call request, the call control unit 100 completes the call transfer processing by transmitting REFER-TO to the calling terminal 2 and establishes a call connection between the calling terminal 2 and the called terminal 2. When a call connection is established, the call control unit 100 instructs the unregistered terminal call control unit 102 to delete information regarding the session from the unregistered terminal management table 13b. Accordingly, information on each session for which a call connection has been established may be reliably deleted from the unregistered terminal call control unit 102.

When the called terminal 2 having received the call request (INVITE) transferred by the SIP server 1 either refuses to respond to the call request or fails to respond within a specific period of time, the call control unit 100 aborts the call request transfer to the called terminal 2. The call control unit 100 then transmits a disconnect request (BYE) to the calling terminal 2 and terminates communication with the calling terminal 2. In addition, the call control unit 100 instructs the unregistered terminal call control unit 102 to delete information regarding the session from the calling terminal 2 from the unregistered terminal management table 13b. Accordingly, information on each session for which communication has been terminated may be reliably deleted from the unregistered terminal call control unit 102.

Due to the processing described above, the unregistered terminal call control unit 102 acquires events such as the transmission of an SMS message by the SIP server 1 to the called terminal 2, the reception of an SIP registration request from the called terminal 2, and the like. In addition, the unregistered terminal call control unit 102 updates the call state in the unregistered terminal management table 13b when the call state indicated by the acquired event is appropriate as a transition result from an immediately previous call state stored in the unregistered terminal management table 13b. Accordingly, the respective call states of calls managed by the unregistered terminal management table 13b may be known in an accurate manner.

Figure 7:
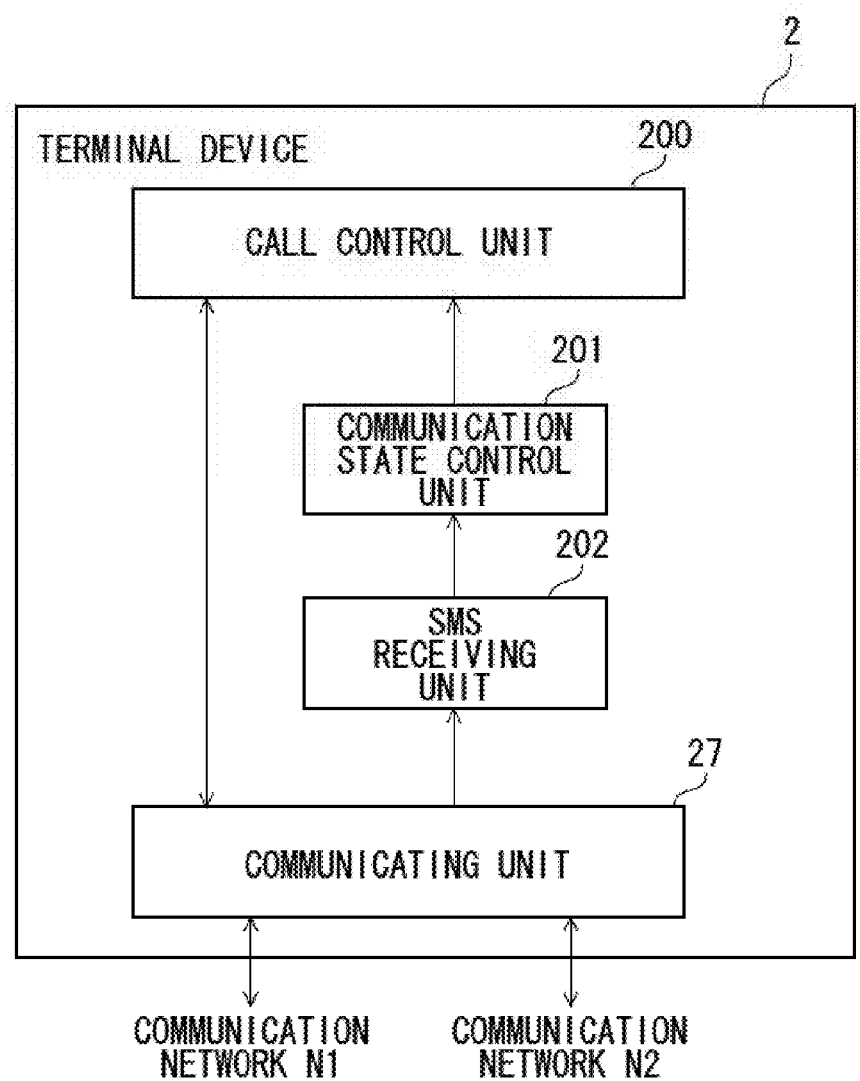
FIG. 7 illustrates a functional configuration of the terminal device according to the first embodiment.

Hereinafter, a description will now be given on functions realized by the control unit 20 of the terminal device 2 by executing a control program stored in the ROM 21 or the storage unit 23 in the IP telephone system configured as described above. FIG. 7 illustrates a functional configuration of the terminal device 2 according to the first embodiment.

In the terminal device 2 according to the present first embodiment, the control unit 20 realizes the functions of a call control unit 200, a communication state control unit 201, an SMS receiving unit 202, and the like by executing a control program stored in the ROM 21 or the storage unit 23. When only performing communication via the communication network N1, the terminal device 2 does not perform line exchange communication and therefore need not include the communication state control unit 201 and the SMS receiving unit 202.

The call control unit 200 performs processing such as transmitting/receiving call control messages (SIPs) via the communicating unit 27, managing the call state of each SIP, and the like. For example, when receiving a call request (INVITE) transferred by the SIP server 1 via the communication network N1 or the communication network N2, the call control unit 200 notifies the incoming call to the user of the terminal device 2. The call control unit 200 either causes device information of the calling terminal 2 or a user name to be displayed on the display unit 24 or causes the sound input/output unit 26 to output a ringing tone.

The user of the terminal device 2 having been notified of the incoming call operates a response button of the operating unit 25 when responding to the incoming call and operates a cancel button of the operating unit 25 when not responding to the incoming call. When the response button is operated, the call control unit 200 transmits a successful response (200 OK) to the SIP server 1 via the communicating unit 27, and when the cancel button is operated, transmits a denial response (480 Temporarily Unavailable) to the SIP server 1 via the communicating unit 27.

Upon receiving a successful response (200 OK) from the terminal device (called terminal) 2, the call control unit 100 of the SIP server 1 transfers the successful response to the calling terminal 2. When receiving a response for acknowledgment (ACK) to the successful response from the calling terminal 2, the call control unit 100 transfers the received response for acknowledgment (ACK) to the called terminal 2. Accordingly, communication between the calling terminal 2 and the called terminal 2 is commenced.

Upon receiving a disconnect request (BYE) from the terminal device (called terminal) 2, the call control unit 100 of the SIP server 1 transfers the disconnect request to the calling terminal 2. When receiving a disconnect request from the SIP server 1, the call control unit 200 of the terminal device (calling terminal) 2 transmits a response (200 OK) notifying that disconnect was successful to the calling terminal 2 via the SIP server 1.

The SMS receiving unit 202 receives the SMS message transmitted by the SMS server 3 via the communicating unit 27. When receiving an SMS message indicating that a call request has been made, the SMS receiving unit 202 notifies the communication state control unit 201 as such. When notified of the reception of an SMS message indicating that a call request has been made, the communication state control unit 201 judges whether its own terminal device 2 is currently IP-connected or not. The communication state control unit 201 judges whether or not an IP address has been assigned to its own terminal device 2.

When the communication state control unit 201 judges that its own terminal device 2 is currently IP-connected, the communication state control unit 201 notifies the call control unit 200 that an IP connection is being made. When notified by the communication state control unit 201 that an IP connection is being made, the call control unit 200 transmits an SIP registration request (REGISTER) including the IP address assigned to its own terminal device 2 and the SIP-URI of its own terminal device 2 to the SIP server 1.

On the other hand, when the communication state control unit 201 judges that its own terminal device 2 is not IP-connected, the communication state control unit 201 notifies the call control unit 200 that an IP connection is not being made. When notified by the communication state control unit 201 that an IP connection is not being made, the call control unit 200 requests a specific server that assigns IP addresses to the terminal devices 2 to make an IP connection and assign an IP address to its own terminal device 2. When an IP address assigned by the specific server is acquired, the call control unit 200 transmits an SIP registration request (REGISTER) including the acquired IP address and the SIP-URI of its own terminal device 2 to the SIP server 1.

As described above, after receiving the SIP registration request, the SIP server 1 acquires the SIP-URI and the IP address of the terminal device 2 having made the SIP registration request from the received SIP registration request and performs processing such as causing the registered information table 13a to store the SIP-URI and the IP address in correspondence with the terminal device 2.

In the IP telephone system configured as described above, when the calling terminal 2 makes a call via the communication network N1, the SIP server 1 acquires the SIP-URI of the called terminal 2 from the call request (INVITE) received from the calling terminal 2. If an IP address corresponding to the acquired SIP-URI of the called terminal 2 is registered in the registered information table 13a, the SIP server 1 transfers the call request received from the calling terminal 2 to the called terminal 2. If a successful response to the call request is made from the called terminal 2, the SIP server 1 establishes a call connection between the calling terminal 2 and the called terminal 2.

On the other hand, if an IP address corresponding to the SIP-URI of the called terminal 2 acquired from the call request is not registered in the registered information table 13a, the SIP server 1 causes the unregistered terminal management table 13b to store information regarding the call (session). The SIP server 1 then transmits, to the called terminal 2, an SMS message indicating that a call request has been made, and after establishing the call between the calling terminal 2 and setting a hold state, transmits to the calling terminal 2 holding tone data indicating that the called terminal 2 is currently IP-connected. Accordingly, the user of the calling terminal 2 is able to know that the called terminal 2 is currently IP-connecting.

In addition, when receiving the SIP registration request (REGISTER) from the called terminal 2, the SIP server 1 causes the registered information table 13a to store the SIP-URI and the IP address of the called terminal 2. At this point, the SIP server 1 determines whether or not the call state of the called terminal 2 having sent the SIP registration request is "IP connecting" based on the stored contents of the unregistered terminal management table 13b.

If the call state of the called terminal 2 stored in the unregistered terminal management table 13b is "IP connecting", the SIP server 1 updates the call state of the called terminal 2 stored in the unregistered terminal management table 13b to "Calling". At this point, the SIP server 1 begins transferring the call request received from the calling terminal 2 to the called terminal 2, and transmits holding tone data indicating that the called terminal 2 is being called to the calling terminal 2. Accordingly, the user of the calling terminal 2 is able to know that the called terminal 2 is currently being called.

In addition, if a successful response to the call request is made from the called terminal 2, the SIP server 1 establishes a call connection between the calling terminal 2 and the called terminal 2. When updating the call state of the called terminal 2 stored in the unregistered terminal management table 13b from "IP connecting" to "Calling", the SIP server 1 according to the present first embodiment determines whether or not the call state of the called terminal 2 having transmitted the SIP registration request is "IP connecting". Accordingly, it is possible to determine whether the call state of the called terminal 2 to be updated is appropriate or not.

Figure 8:
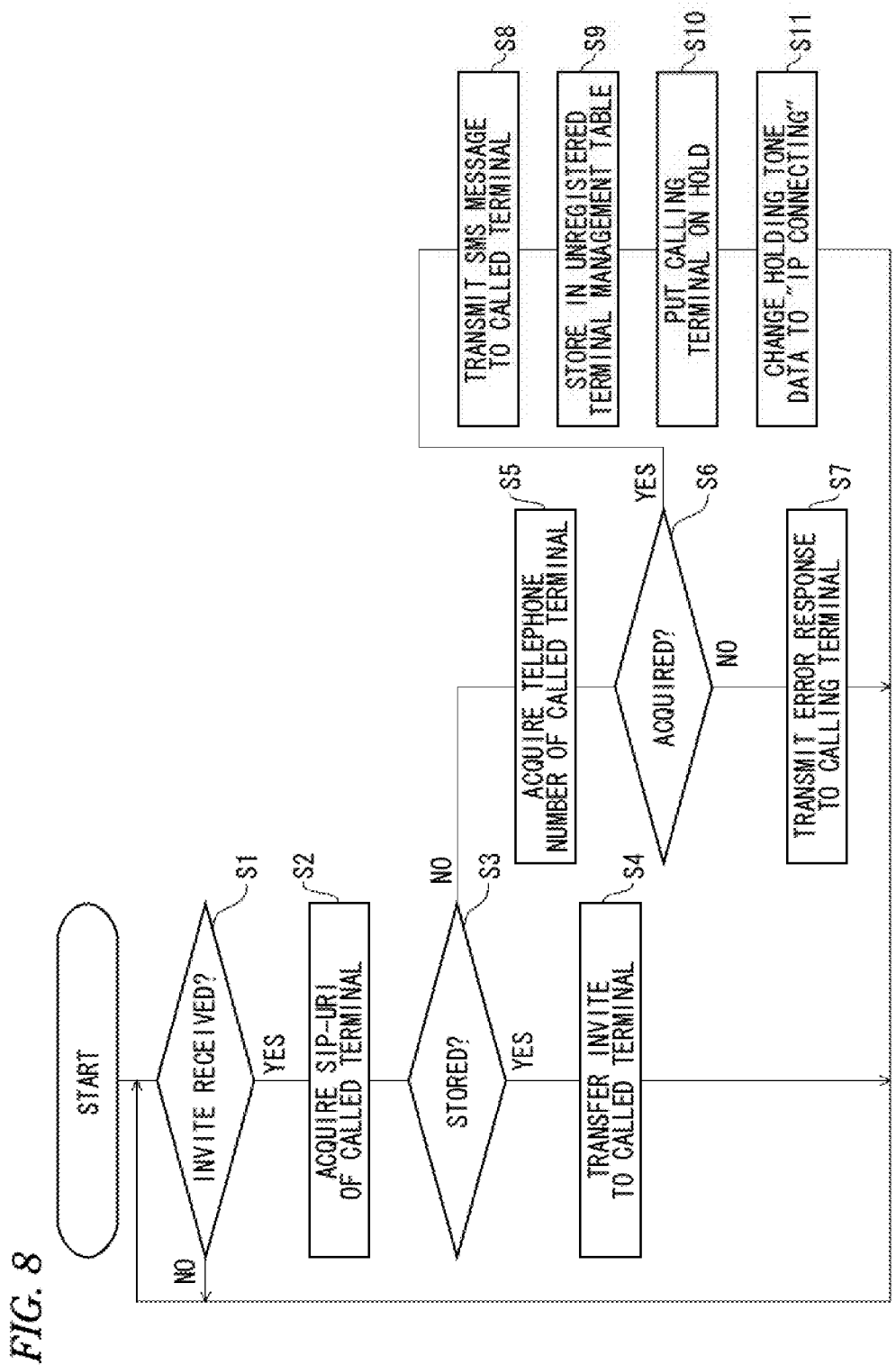
FIG. 8 illustrates processing performed by the SIP server.

Hereinafter, a description will be given with reference to a flowchart on processing performed in the IP telephone system according to the present embodiment by the SIP server 1 when receiving a call request (INVITE) from the terminal device 2. FIG. 8 illustrates a procedure of processing performed by the SIP server 1. The following processing is to be executed by the control unit 10 according to a control program stored in the ROM 11 or the storage unit 13 of the SIP server 1.

The control unit 10 of the SIP server 1 determines whether or not a call request (INVITE) outputted by any of the terminal devices 2 has been received (S1). When the control unit 10 determines that a call request outputted by any of the terminal devices 2 has not been received (S1: NO), the control unit 10 stands by until such a call request is received by performing normal operations. When the control unit 10 determines that a call request outputted by any of the terminal devices 2 has been received (S1: YES), the control unit 10 acquires an SIP-URI of the called terminal 2 from the received call request (S2).

The control unit 10 determines whether or not an IP address corresponding to the acquired SIP-URI of the called terminal 2 is stored in the registered information table 13a (S3). When the control unit 10 determines that an IP address corresponding to the acquired SIP-URI of the called terminal 2 is stored in the registered information table 13a (S3: YES), the control unit 10 acquires an IP address stored in the registered information table 13a in correspondence with the SIP-URI of the called terminal 2. Based on the acquired IP address of the called terminal 2, the control unit 10 forwards the call request (INVITE) received from the calling terminal 2 to the called terminal 2 (S4). The control unit 10 then returns to step S1.

When the control unit 10 determines that an IP address corresponding to the SIP-URI of the called terminal 2 is not stored in the registered information table 13a (S3: NO), the control unit 10 acquires the SIP-URI of the called terminal 2 from the received call request (INVITE). In addition, based on the SIP-URI of the called terminal 2, the control unit 10 acquires the telephone number of the called terminal 2 on the communication network N2 from the number management table 13c based on the SIP-URI of the called terminal 2 (S5).

The control unit 10 determines whether or not the telephone number of the called terminal 2 has been acquired (S6). When the control unit 10 determines that the telephone number of the called terminal 2 has not been acquired (S6: NO), the control unit 10 transmits an error response (404 Not Found) to the calling terminal 2 (S7) and terminates communication with the calling terminal 2. The control unit 10 then returns to step S1.

When the control unit 10 determines that the telephone number of the called terminal 2 has been acquired (S6: YES), based on the acquired telephone number, the control unit 10 transmits an SMS message to the called terminal 2 indicating that a call request has been made (S8). The control unit 10 causes the unregistered terminal management table 13b to store information regarding the call control (session) to the called terminal 2 (S9). The control unit 10 holds the call connection to the calling terminal 2 having transmitted the call request to the called terminal 2 (S10), and changes the holding tone data to be transmitted to the calling terminal 2 to holding tone data corresponding to the "IP connecting" call state (S11). The control unit 10 then returns to step S1.

Figure 9:
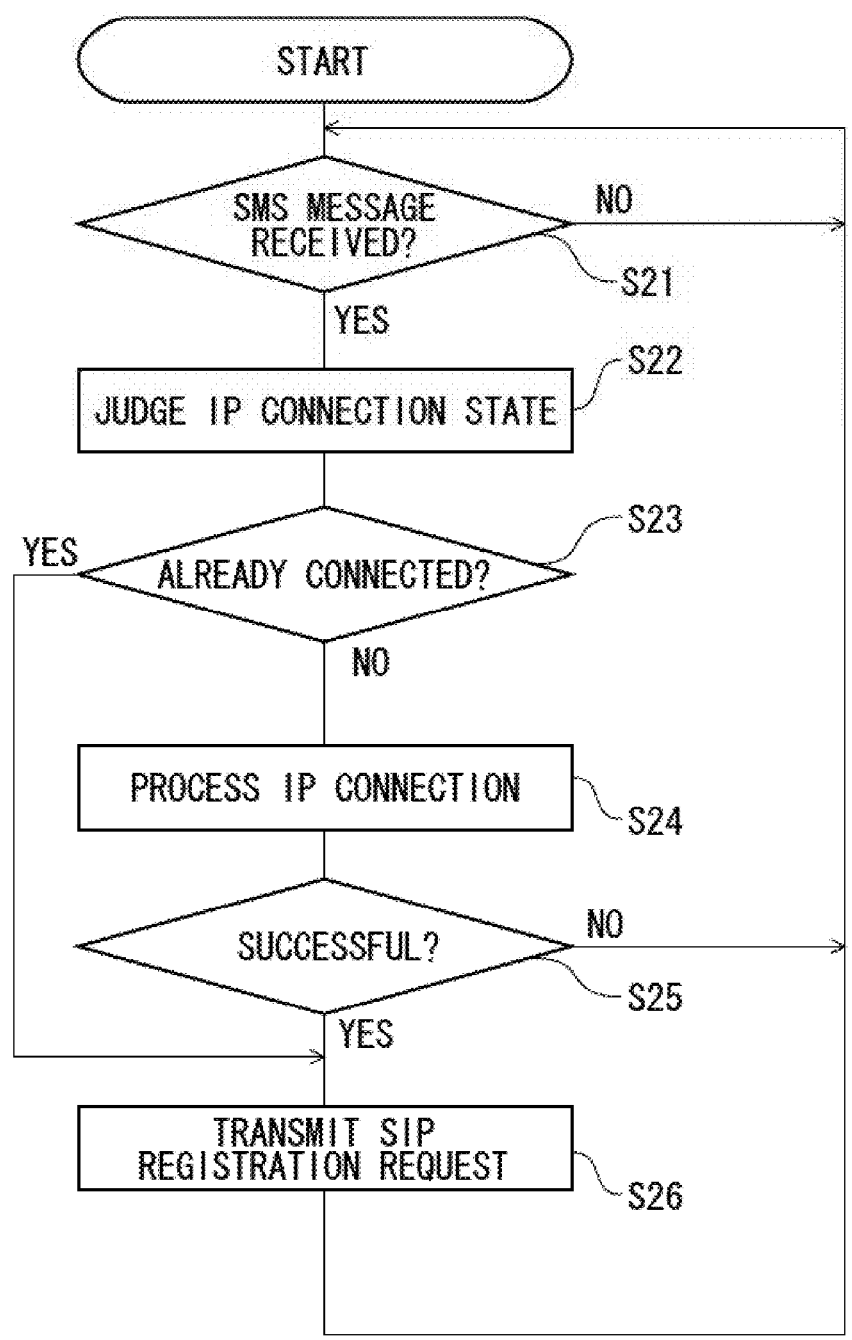
FIG. 9 illustrates processing performed by the terminal device.

Next, with reference to a flowchart, a description will be given on processing to be performed by the terminal device (called terminal) 2 when receiving, from the SIP server 1, an SMS message indicating that a call request is being made as described above. FIG. 9 illustrates a procedure of processing performed by the terminal device 2. The following processing is to be executed by the control unit 20 according to a control program stored in the ROM 21 or the storage unit 23 of the terminal device 2.

The control unit 20 of the terminal device 2 determines whether or not an SMS message indicating that a call request is being made has been received from the SIP server 1 (S21). When the control unit 20 determines that an SMS message indicating that a call request is being made has not been received from the SIP server 1 (S21: NO), the control unit 20 stands by until such an SMS message is received by performing normal operations. When the control unit 20 determines that an SMS message indicating that a call request is being made has been received from the SIP server 1 (S21: YES), the control unit 20 judges the IP connection state of its own terminal device 2 (S22).

When the control unit 20 judges that IP connection has not been established (S23: NO), the control unit 20 performs IP connection processing (S24). The control unit 20 requests a specific server to make an IP connection and to assign an IP address to its own terminal device 2. The control unit 20 determines whether the IP connection is successful or not (S25). When the control unit 20 judges that IP connection is successful (S25: YES) or, in other words, when an IP address has been assigned, the control unit 20 transmits an SIP registration request (REGISTER) to the SIP server 1 in order to register the assigned IP address in the SIP server 1 (S26). The control unit 20 then returns to step S21.

When the control unit 20 determines that IP connection is unsuccessful (S25: NO) or, in other words, when an IP address has not been assigned, the control unit 20 returns to step S21. When the control unit 20 determines that an IP connection has been made (S23: YES), the control unit 20 skips processing of steps S24 and S25 and transmits an SIP registration request (REGISTER) to the SIP server 1 in order to register the already assigned IP address in the SIP server 1 (S26). The control unit 20 then returns to step S21.

Figure 10:
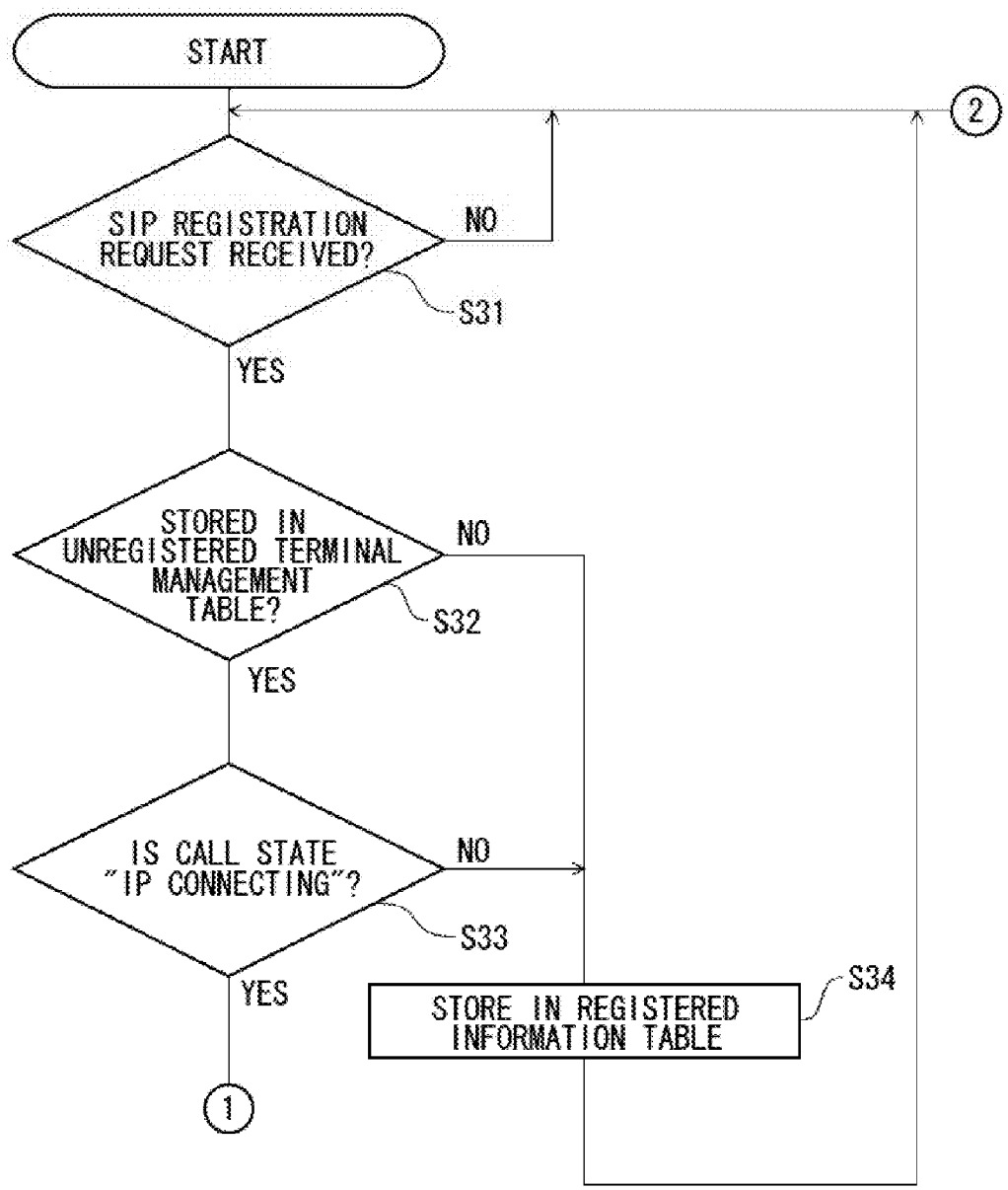
FIG. 10 illustrates processing performed by the SIP server.
Figure 11:
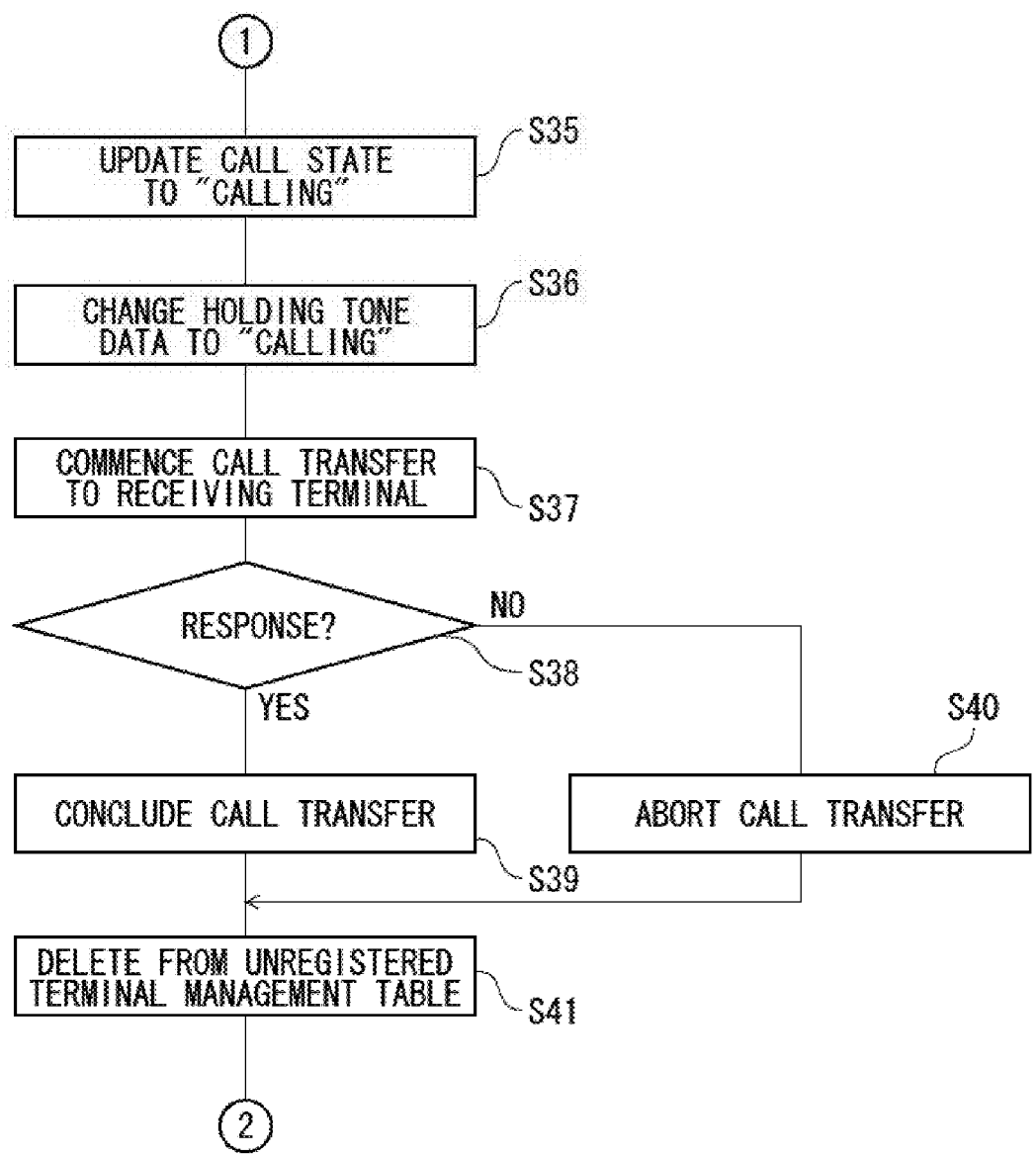
FIG. 11 illustrates processing performed by the SIP server.

Next, a description will be given with reference to flowcharts on processing performed by the SIP server 1 when receiving an SIP registration request from the terminal device 2 as described above. FIGS. 10 and 11 illustrate processing to be performed by the SIP server 1. The following processing is to be executed by the control unit 10 according to a control program stored in the ROM 11 or the storage unit 13 of the SIP server 1.

The control unit 10 of the SIP server 1 determines whether or not an SIP registration request (REGISTER) outputted by any of the terminal devices 2 has been received (S31). When the control unit 10 determines that an SIP registration request outputted by any of the terminal devices 2 has not been received (S31: NO), the control unit 10 stands by until such a call request is received by performing normal operations. When the control unit 10 determines that an SIP registration request outputted by any of the terminal devices 2 has been received (S31: YES), the control unit 10 acquires, from the received SIP registration request, the SIP-URI of the terminal device 2 having made the SIP registration request. The control unit 10 determines whether or not the acquired SIP-URI of the terminal device 2 is stored in the called party URI field of the unregistered terminal management table 13b (S32).

When the control unit 10 determines that the SIP-URI of the terminal device 2 having made the SIP registration request is stored in the called party URI field of the unregistered terminal management table 13b (S32: YES), the control unit 10 determines whether or not the call state stored in the unregistered terminal management table 13b in correspondence with the SIP-URI is "IP connecting" (S33).

When the control unit 10 either determines that the SIP-URI of the terminal device 2 having made the SIP registration request is not stored in the called party URI field of the unregistered terminal management table 13b (S32: NO) or determines that the corresponding call state is not "IP connecting" (S33: NO), the control unit 10 acquires, from the received SIP registration request, the SIP-URI and the IP address of the terminal device 2 having made the SIP registration request. The control unit 10 associates the acquired SIP-URI with the IP address, and causes the registered information table 13a to store the same (S34). The control unit 10 then returns to step S31.

When the control unit 10 determines that the corresponding call state is "IP connecting" (S33: YES), the control unit 10 updates the call state of the call using the SIP-URI of the terminal device 2 having made the SIP registration request as the called party URI to "Calling" (S35). The control unit 10 changes the holding tone data to be transmitted to the calling terminal 2 of the call to holding tone data corresponding to the "Calling" call state (S36).

The control unit 10 acquires, from the received SIP registration request, the SIP-URI and the IP address of the terminal device 2 having made the SIP registration request, associates the acquired SIP-URI with the IP address, and causes the registered information table 13a to store the same. The control unit 10 then transmits a call request (INVITE) to the terminal device (called terminal 2) having made the SIP registration request and commences call processing (call transfer) (S37).

The control unit 10 determines whether or not a successful response has been made from the called terminal 2 to which the call transfer has commenced (S38). When the control unit 10 determines that a successful response has been made from the called terminal 2 to which the call transfer has commenced (S38: YES), the control unit 10 transmits transfer completion (REFER-TO) to the calling terminal 2 and concludes the call transfer (S39). Accordingly, a call connection is established between the calling terminal 2 and the called terminal 2. Once the call connection is established, the control unit 10 deletes information regarding the call from the unregistered terminal management table 13b (S41), and returns to step S31.

When the control unit 10 determines that a successful response has not been made from the called terminal 2 to which the call transfer has commenced (S38: NO), the control unit 10 aborts the call transfer to the called terminal 2 (S40) and terminates the call to the calling terminal 2 (BYE). Once the call connection has been aborted, the control unit 10 deletes information regarding the call from the unregistered terminal management table 13b (S41), and returns to step S31.

According to the processing described above, when a call request is received from the calling terminal 2, the SIP server 1 establishes a call connection between the calling terminal 2 and the called terminal 2 if the called terminal 2 is in a call-connectable state. If the called terminal 2 is not in a call-connectable state, the SIP server 1 places the call connection to the calling terminal 2 on hold until the called terminal 2 changes to a call-connectable state. The SIP server 1 then changes the holding tone to be sent to the calling terminal 2 on hold to a holding tone corresponding to the state of the called terminal 2 or, in other words, a holding tone that notifies "IP connecting", "Calling", or the like. Accordingly, the user of the calling terminal 2 is able to know the state of the called terminal 2 by listening to the holding tone until the called terminal 2 changes to a call-connectable state. Therefore, based on the state of the called terminal 2, the user of the calling terminal 2 is able to appropriately determine whether to wait for a response from the called terminal 2, disconnect the connection, or the like.

In addition to the respective processing described above, the control unit 10 of the SIP server 1 periodically (for example, every several tens of seconds) monitors the elapsed time field of the unregistered terminal management table 13b and determines whether or not there is a call whose elapsed time has reached or exceeded a specific period of time (for example, 60 seconds). When the control unit 10 determines that there is a call whose elapsed time has reached or exceeded the specific period of time, the control unit 10 transmits a disconnect request to the calling terminal 2 of the call to notify the occurrence of an error. In addition, the control unit 10 deletes information regarding the call from the unregistered terminal management table 13b. As described above, by determining a call whose elapsed time from the reception of a call request by the SIP server 1 has reached or exceeded a specific period of time to be a call for which connection has failed, a situation may be avoided where the user of the calling terminal 2 is forced to wait needlessly.

In the present first embodiment, the SIP server 1 includes the holding tone transmitting unit 105, and by changing the holding tone data to be transmitted from the holding tone transmitting unit 105 to the calling terminal 2 whose call state has been placed on hold, changes the holding tone to be outputted by the calling terminal 2. The present invention need not be limited to such an embodiment and, for example, a media server may be provided separately, in which case a call is to be made between the calling terminal 2 and the media server and holding tone data is to be transmitted from the media server to the calling terminal 2. In this case, by setting the call state of the calling terminal 2 to a pseudo-hold state and by having the holding tone changing unit 104 transmit a holding tone change request to the media server, a specified holding tone may be transmitted to the calling terminal 2.

In the present first embodiment, when the called terminal 2 does not respond to a call request transferred by the SIP server 1, the SIP server 1 concludes the call request transfer and disconnects connection to the calling terminal 2. In addition to such an embodiment, a message such as "The partner terminal is not responding", "The partner terminal has been disconnected", and the like may be arranged to be notified to the calling terminal 2 by a holding tone before disconnecting the connection to the calling terminal 2. In this case, a notification on the reason why communication was not established may be forwarded to the user of the calling terminal 2.

SECOND EMBODIMENT

Hereinafter, an IP telephone system according to a second embodiment will be described. Since the IP telephone system according to the present second embodiment may be realized by the same configuration as the IP telephone system according to the first embodiment described above, similar components shall be denoted by like reference numerals and a description thereof shall be omitted.

The IP telephone system according to the first embodiment described above is configured such that from the moment a call is made from the calling terminal 2 to the called terminal 2 until a call connection is established with the called terminal 2, the state of the called terminal 2 is notified to the calling terminal 2. The first embodiment is configured such that when the called terminal 2 is being IP-connected, the SIP server 1 notifies the calling terminal 2 as such, and when the called terminal 2 is being called, the SIP server 1 notifies the calling terminal 2 as such.

In addition to notifying the calling terminal 2 when the called terminal 2 is being IP-connected and when the called terminal 2 is being called, the IP telephone system according to the present second embodiment also notifies the calling terminal 2 during VPN authentication of the called terminal 2 as such.

Figure 12:
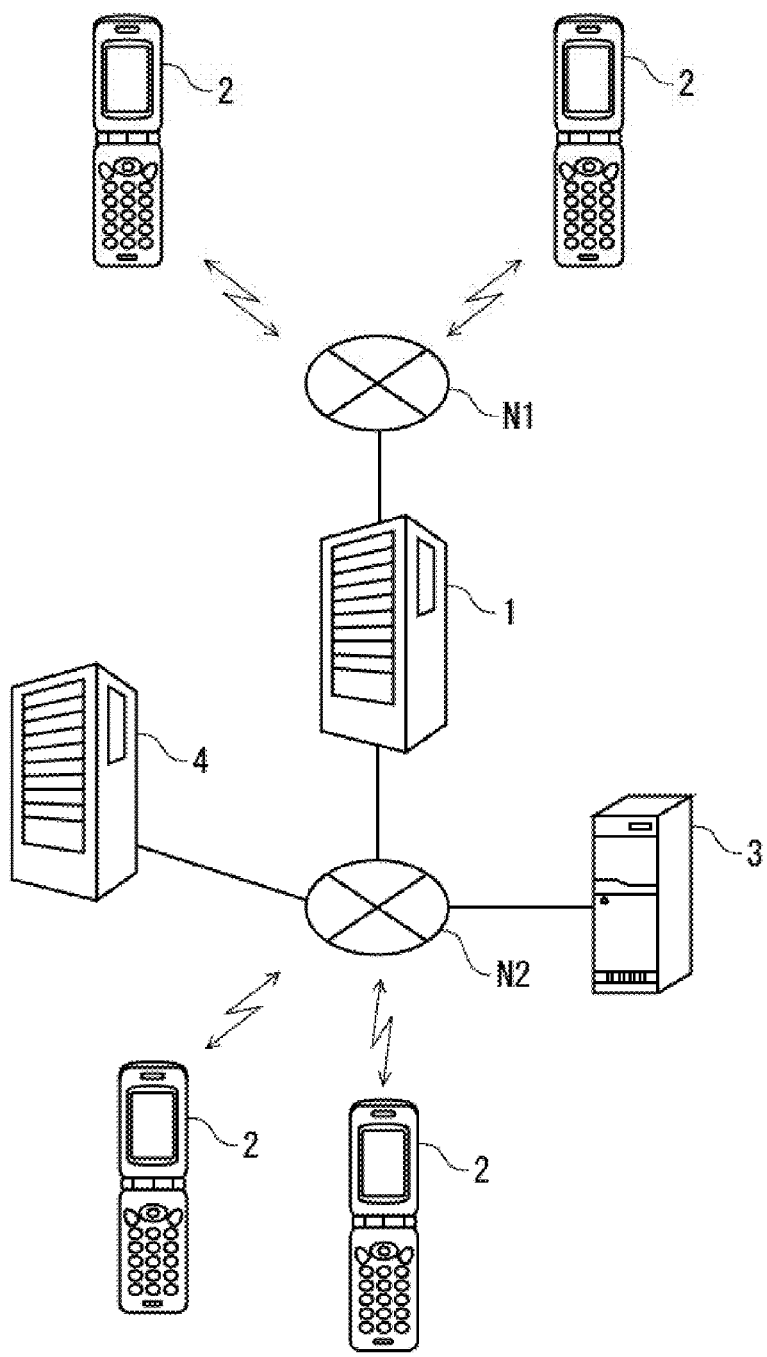
FIG. 12 illustrates a configuration of an IP telephone system according to a second embodiment.

FIG. 12 illustrates a configuration of an IP telephone system according to the second embodiment. In addition to the configuration of the IP telephone system according to the first embodiment described above, the IP telephone system according to the present second embodiment includes a VPN (Virtual Private Network) server 4 that is connected to the communication network N2. The VPN server 4 performs packet exchange communication between the SIP server 1 and the terminal devices 2 via the communication network N2. When communicating with the terminal device 2 via the communication network N2, the SIP server 1 according to the present second embodiment 2 connects to the communication network N2 via the VPN server 4 (relay device).

Figure 13:
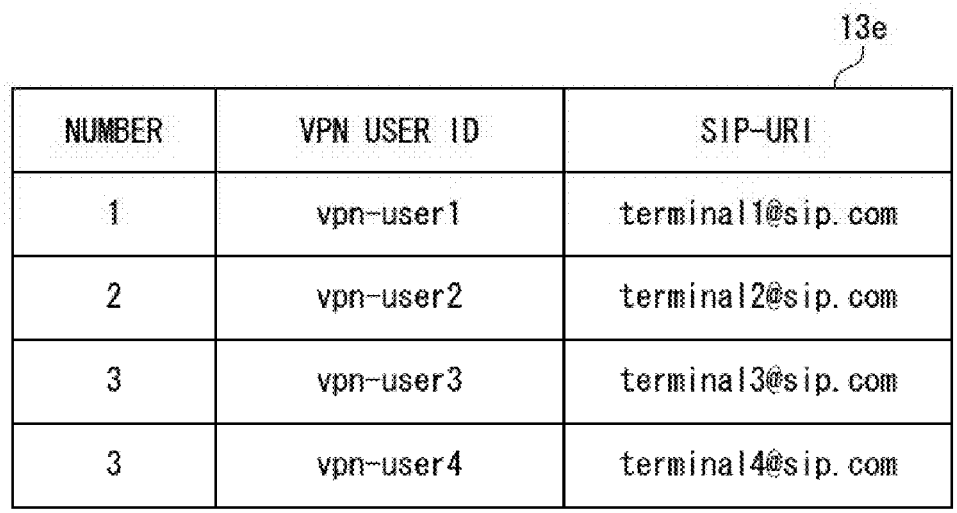
FIG. 13 illustrates stored contents of a VPN-SIP correspondence table.

FIG. 13 illustrates stored contents of a VPN-SIP correspondence table 13e. In addition to the configuration illustrated in FIG. 2, the SIP server 1 according to the present second embodiment 2 stores a VPN-SIP correspondence table 13e such as that illustrated in FIG. 13 in the storage unit 13. As illustrated in FIG. 13, the VPN-SIP correspondence table 13e stores, for each user for which communication via the VPN server 4 is permitted, a number, a user ID (VPN user ID), SIP-URIs of terminal devices 2 of each user, and the like in correspondence with each user. Stored contents of the VPN-SIP correspondence table 13e are stored or deleted by the control unit 10 in response to the input of information by an administrator of the IP telephone system when a terminal device 2 for which communication via the SIP server 1 has been permitted is added or discarded.

Figure 14:
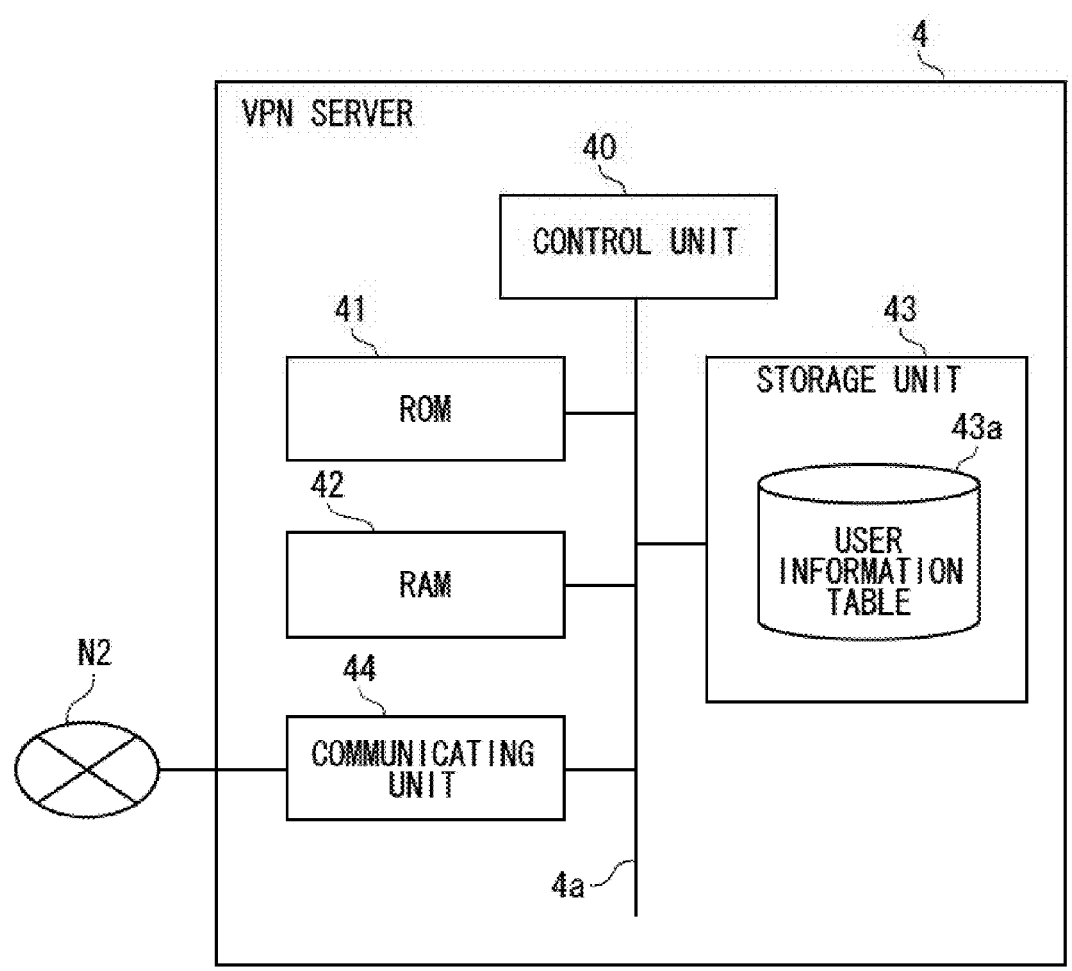
FIG. 14 illustrates a configuration of a VPN server according to the second embodiment.

FIG. 14 illustrates a configuration of the VPN server 4 according to the second embodiment. The VPN server 4 according to the present second embodiment includes a control unit 40, a ROM 41, a RAM 42, a storage unit 43, a communicating unit 44, and the like. The respective hardware units are mutually connected via a bus 4a.

The control unit 40 is a CPU, an MPU, or the like, and at a specific timing, reads out a control program stored in advance in the ROM 41 or the storage unit 43 to the RAM 42 and executes the same. In addition, the control unit 40 controls the operations of the respective hardware units described above. The ROM 41 stores, in advance, various control programs for causing the VPN server 4 to operate as a relay device disclosed in the present application. The RAM 42 is an SRAM, a flash memory, or the like, and temporarily stores various data generated when the control program is executed by the control unit 40.

The storage unit 43 is a large-capacity storage device such as a hard disk drive. The storage unit 43 stores, in advance, various control programs for causing the VPN server 4 to operate as a relay device disclosed in the present application. In addition, the storage unit 43 stores a user information table 43a such as that illustrated in FIG. 15, and the like.

The communicating unit 44 is an interface for connecting to the communication network N2, and pursuant to an instruction from the control unit 40, performs packet exchange communication between the SIP server 1 and the terminal device 2 via the communication network N2.

Figure 15:
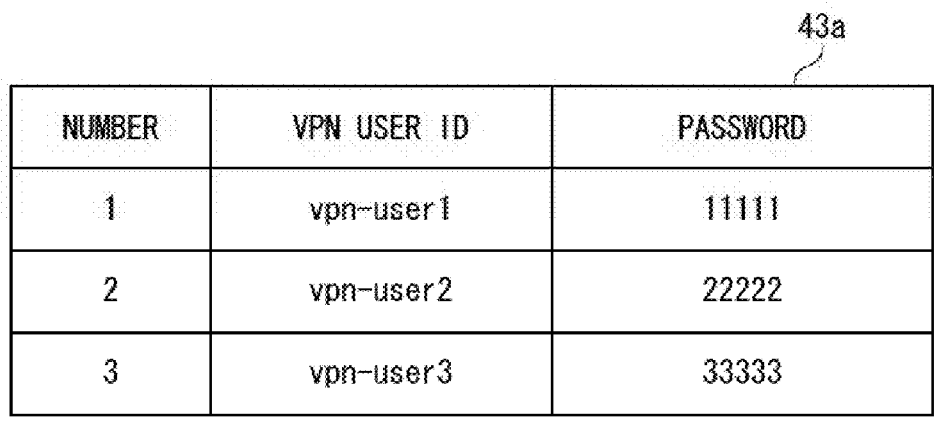
FIG. 15 illustrates stored contents of a user information table.

FIG. 15 illustrates stored contents of the user information table 43a. As illustrated in FIG. 15, the user information table 43a stores, for each user for which communication via the VPN server 4 is permitted, a number, a user ID (a VPN user ID), a password registered in advance by each user, and the like, in correspondence with each user. Stored contents of the user information table 43a are stored or deleted by the control unit 40 in response to the input of information by an administrator of the IP telephone system when a user for which communication via the VPN server 4 has been permitted is added or discarded.

Figure 16:
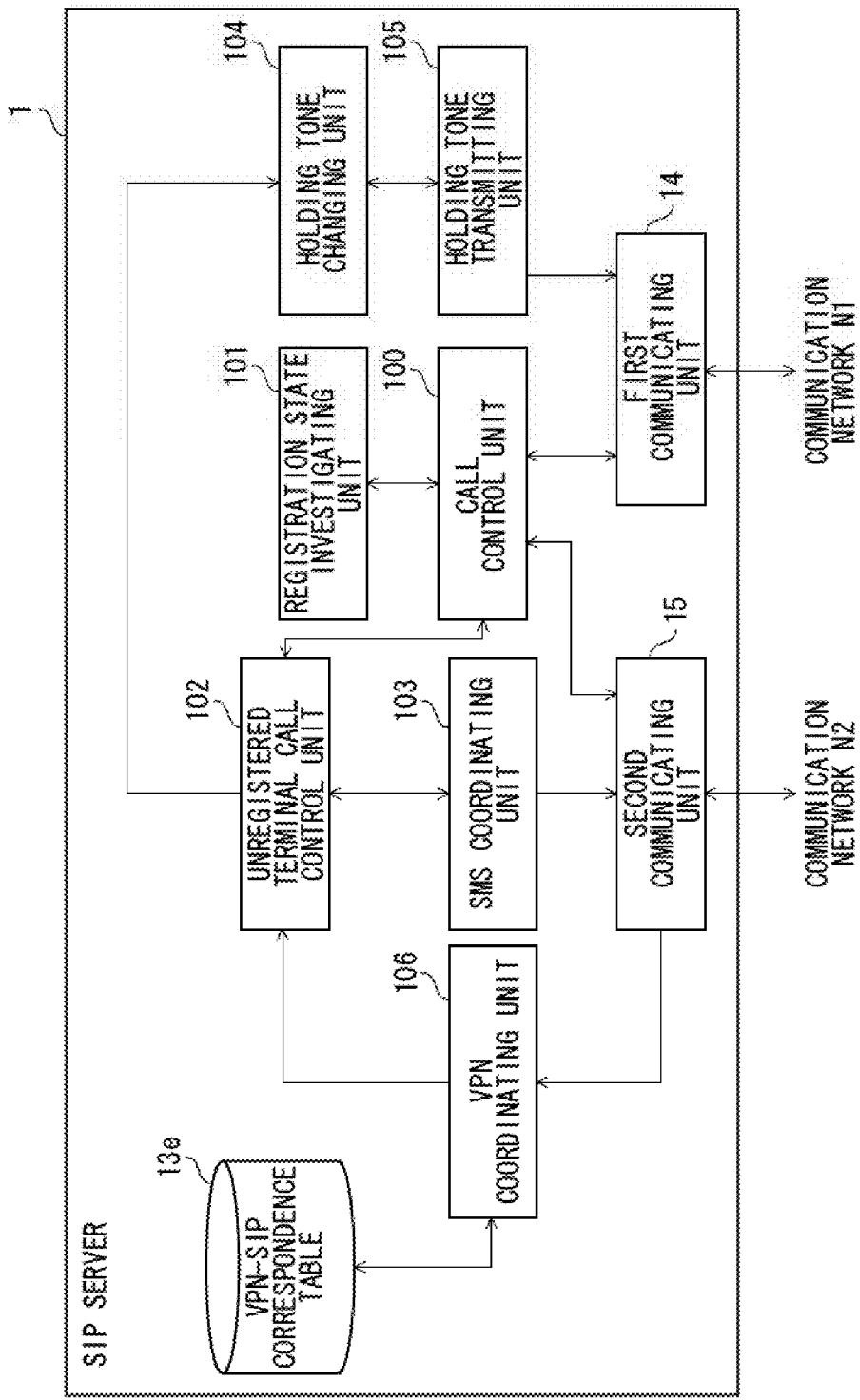
FIG. 16 illustrates a functional configuration of an SIP server according to the second embodiment.

Hereinafter, a description will be given on functions realized by the control unit 10 of the SIP server 1 by executing a control program stored in the ROM 11 or the storage unit 13 in the IP telephone system according to the present second embodiment. FIG. 16 illustrates a functional configuration of the SIP server 1 according to the second embodiment.

With the SIP server 1 according to the present second embodiment, by executing a control program stored in the ROM 11 or the storage unit 13, the control unit 10 realizes the function of a VPN coordinating unit 106 in addition to the respective functions illustrated in FIG. 6.

The VPN coordinating unit (state acquiring unit) 106 acquires from the VPN server 4 via the second communicating unit 15 a user ID (a VPN user ID) of the user of a terminal device 2 having made a VPN authentication request to the VPN server 4. The VPN coordinating unit 106 searches among stored contents of the VPN-SIP correspondence table 13e and determines whether or not the VPN user ID acquired from the VPN server 4 is stored in the VPN-SIP correspondence table 13e.

If the VPN user ID acquired from the VPN server 4 is not stored in the VPN-SIP correspondence table 13e, the VPN coordinating unit 106 does not perform anything. On the other hand, if the VPN user ID acquired from the VPN server 4 is stored in the VPN-SIP correspondence table 13e, the VPN coordinating unit 106 reads out an SIP-URI stored in the VPN-SIP correspondence table 13e in correspondence with the VPN user ID.

The VPN coordinating unit 106 sends the SIP-URI read out from the VPN-SIP correspondence table 13e to the unregistered terminal call control unit 102 as the SIP-URI of the terminal device 2 having made the VPN authentication request. The unregistered terminal call control unit 102 determines whether or not the SIP-URI acquired from the VPN coordinating unit 106 is stored in the called party URI field of the unregistered terminal management table 13b. If the SIP-URI acquired from the VPN coordinating unit 106 is not stored in the called party URI field of the unregistered terminal management table 13b, the unregistered terminal call control unit 102 does not perform anything.

On the other hand, if the SIP-URI acquired from the VPN coordinating unit 106 is stored in the called party URI field of the unregistered terminal management table 13b, the unregistered terminal call control unit 102 determines whether or not the call state stored in the unregistered terminal management table 13b in correspondence with the SIP-URI is "IP connecting". Accordingly, the unregistered terminal call control unit 102 judges whether or not the terminal device 2 whose SIP-URI has been acquired from the VPN coordinating unit 106 is able to make a transition in an appropriate manner from the call state already stored in the unregistered terminal management table 13b to the new call state.

When the corresponding call state is not "IP connecting", the unregistered terminal call control unit 102 does not perform anything because the call state of the terminal device 2 having made the VPN authentication request is not appropriate. When the corresponding call state is "IP connecting", the unregistered terminal call control unit (updating unit) 102 updates the call state stored in the unregistered terminal management table 13b in correspondence with the SIP-URI acquired from the VPN coordinating unit 106 to "VPN authenticating". When the corresponding call state is "IP connecting", the terminal device 2 whose SIP-URI has been acquired from the VPN coordinating unit 106 is able to make a transition in an appropriate manner from the call state already stored in the unregistered terminal management table 13b to the new call state.

After updating the unregistered terminal management table 13b, the unregistered terminal call control unit 102 instructs the holding tone changing unit 104 to change the holding tone data to be transmitted by the call control unit 100 to the calling terminal 2 that is on hold to holding tone data corresponding to the "VPN authenticating" call state. Accordingly, holding tone data corresponding to the "VPN authenticating" call state is transmitted from the holding tone transmitting unit 105 to the calling terminal 2. As for the holding tone data corresponding to the "VPN authenticating" call state, audio data or music data that enables the user of the calling terminal 2 to know that the called terminal 2 is in a "VPN authenticating" state may suffice. For example, an audio message such as "VPN authenticating" may be used.

In the same manner as the unregistered terminal call control unit 102 according to the first embodiment described above, the unregistered terminal call control unit 102 according to the present second embodiment acquires the SIP-URI of the terminal device 2 having made the SIP registration request to the SIP server 1 from the call control unit 100. The unregistered terminal call control unit 102 determines whether or not the SIP-URI acquired from the call control unit 100 is stored in the called party URI field of the unregistered terminal management table 13b. The absence of the SIP-URI acquired from the call control unit 100 from the called party URI field of the unregistered terminal management table 13b means that the SIP registration request is a normal SIP registration request. Accordingly, the unregistered terminal call control unit 102 notifies the call control unit 100 as such.

When notified by the unregistered terminal call control unit 102 that the acquired SIP-URI is not stored in the called party URI field of the unregistered terminal management table 13b, the call control unit 100 acquires, from the received SIP registration request, the SIP-URI and the IP address of the terminal device 2 that had made the SIP registration request. The call control unit 100 associates the acquired SIP-URI and IP address, and causes the registered information table 13a to store the same.

On the other hand, if the SIP-URI acquired from the call control unit 100 is stored in the called party URI field of the unregistered terminal management table 13b, the unregistered terminal call control unit 102 determines whether or not the call state stored in the unregistered terminal management table 13b in correspondence with the SIP-URI is "VPN authenticating". Accordingly, the unregistered terminal call control unit 102 judges whether or not the terminal device 2 whose SIP-URI has been acquired from the call control unit 100 is able to make a transition in an appropriate manner from the call state already stored in the unregistered terminal management table 13b to the new call state.

If the corresponding call state is not "VPN authenticating", the SIP registration request is judged to be a normal SIP registration request and the unregistered terminal call control unit 102 notifies the call control unit 100 as such. In this case also, the call control unit 100 acquires, from the received SIP registration request, the SIP-URI and the IP address of the terminal device 2 that made the SIP registration request, associates the acquired SIP-URI with the IP address, and causes the registered information table 13a to store the same.

When the corresponding call state is "VPN authenticating", the unregistered terminal call control unit (updating unit) 102 updates the call state stored in the unregistered terminal management table 13b in correspondence with the SIP-URI acquired from the call control unit 100 to "Calling". At this point, the unregistered terminal call control unit 102 notifies the call control unit 100 that the terminal device 2 with the SIP-URI acquired from the call control unit 100 is expecting an incoming call. When the corresponding call state is "VPN authenticating", the terminal device 2 whose SIP-URI has been acquired from the call control unit 100 is able to make a transition in an appropriate manner from the call state already stored in the unregistered terminal management table 13b to the new call state.

When notified by the unregistered terminal call control unit 102 that the terminal device 2 that made the SIP registration request is expecting an incoming call, the call control unit 100 acquires, from the received SIP registration request, the SIP-URI and the IP address of the terminal device 2 that made the SIP registration request. The call control unit 100 associates the acquired SIP-URI and IP address, and causes the registered information table 13a to store the same. The call control unit 100 then transmits a call request (INVITE) to the called terminal 2.

Moreover, after updating the unregistered terminal management table 13b, the unregistered terminal call control unit 102 instructs the holding tone changing unit 104 to change the holding tone data to be transmitted by the call control unit 100 to the calling terminal 2 that is on hold to holding tone data corresponding to the "Calling" call state. Accordingly, holding tone data corresponding to the "Calling" call state is transmitted from the holding tone transmitting unit 105 to the calling terminal 2.

Respective processing other than that described above is similar to the processing described in the first embodiment above and a description thereof shall be omitted.

Figure 17:
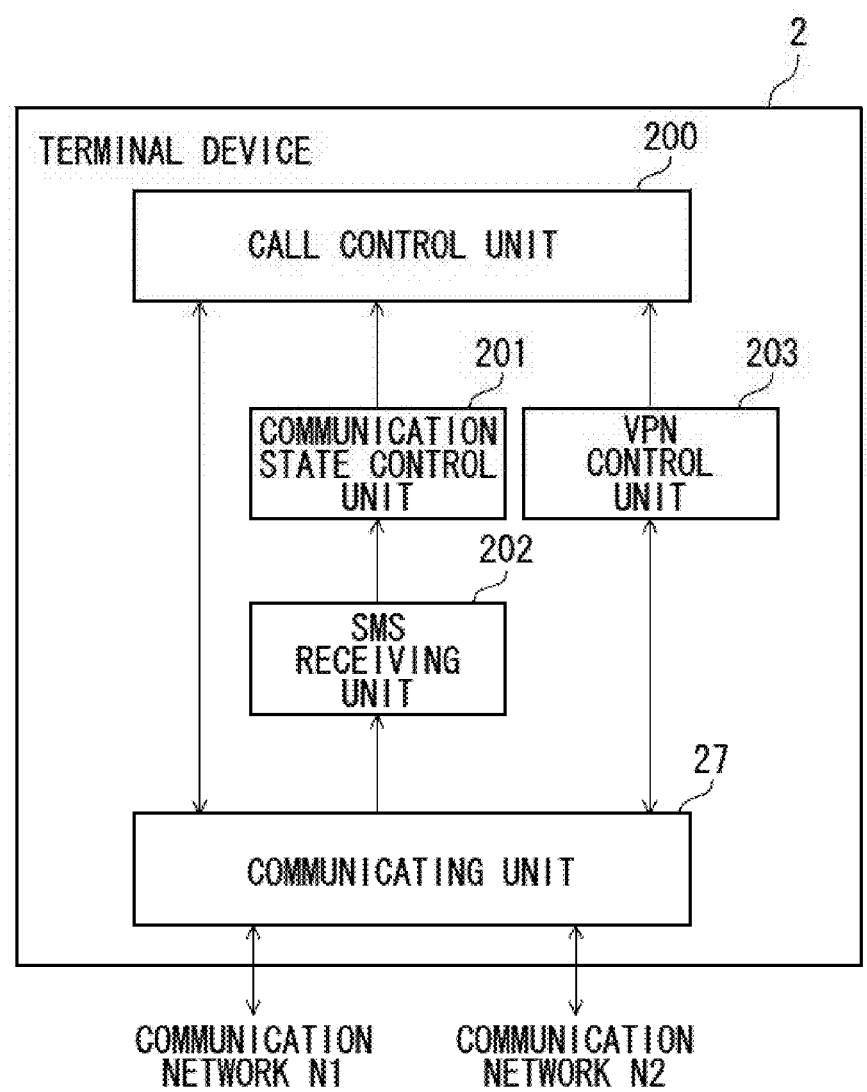
FIG. 17 illustrates a functional configuration of a terminal device according to the second embodiment.

Hereinafter, a description will now be given on functions realized by the control unit 20 of the terminal device 2 by executing a control program stored in the ROM 21 or the storage unit 23 in the IP telephone system according to the present second embodiment. FIG. 17 illustrates a functional configuration of the terminal device 2 according to the second embodiment.

With the terminal device 2 according to the present second embodiment, by executing a control program stored in the ROM 21 or the storage unit 23, the control unit 20 realizes the function of a VPN control unit 203 in addition to the respective functions illustrated in FIG. 7.

In the same manner as the communication state control unit 201 of the first embodiment described above, when the SMS receiving unit 202 receives an SMS message indicating that a call request has been made, the communication state control unit 201 according to the present second embodiment judges whether its own terminal device 2 is currently IP-connected or not.

When the communication state control unit 201 determines that an IP connection has been made or when an IP address has been assigned by a specific server, the VPN control unit 203 determines whether or not its own terminal device 2 is VPN connected. The VPN control unit 203 determines whether or not an IP address (an IP address on the communication network N1) for using the communication network N1 via the VPN server 4 has been assigned to its own terminal device 2.

When the communication state control unit 201 judges that its own terminal device 2 is currently VPN-connected, the VPN control unit 203 notifies the call control unit 200 that a VPN connection is being made. When notified by the VPN control unit 203 that an VPN connection has been made, the call control unit 200 VPN-packetizes (encodes) an SIP registration request (REGISTER) that includes, in its contact header, the IP address on the communication network N1 which is assigned to its own terminal device 2, and transmits the same to the VPN server 4. Upon receiving the VPN packet from the terminal device 2, the VPN server 4 retrieves the original SIP registration request and transfers the same to the SIP server 1.

On the other hand, when the communication state control unit 201 judges that its own terminal device 2 is not currently VPN-connected, the VPN control unit 203 notifies the call control unit 200 that an VPN connection has not been made. When notified by the communication state control unit 201 that a VPN connection has not been made, the call control unit 200 transmits a VPN authentication request to the VPN server 4 and requests the VPN server 4 to assign an IP address on the communication network N1. When an IP address on the communication network N1 is assigned in response to the VPN authentication request, the call control unit 200 VPN-packetizes (encodes) an SIP registration request (REGISTER) that includes, in its contact header, the newly assigned IP address on the communication network N1, and transmits the same to the SIP server 1 via the VPN server 4.

After receiving the SIP registration request, the SIP server 1 acquires the SIP-URI and the IP address on the communication network N1 of the terminal device 2 having made the SIP registration request from the received SIP registration request, and performs processing such as causing the registered information table 13a to store the SIP-URI and the IP address in correspondence with the terminal device 2.

In addition, the VPN control unit 203 performs encoding, decoding, and the like on data when transmitting and receiving called data to and from the VPN server 4.

Figure 18:
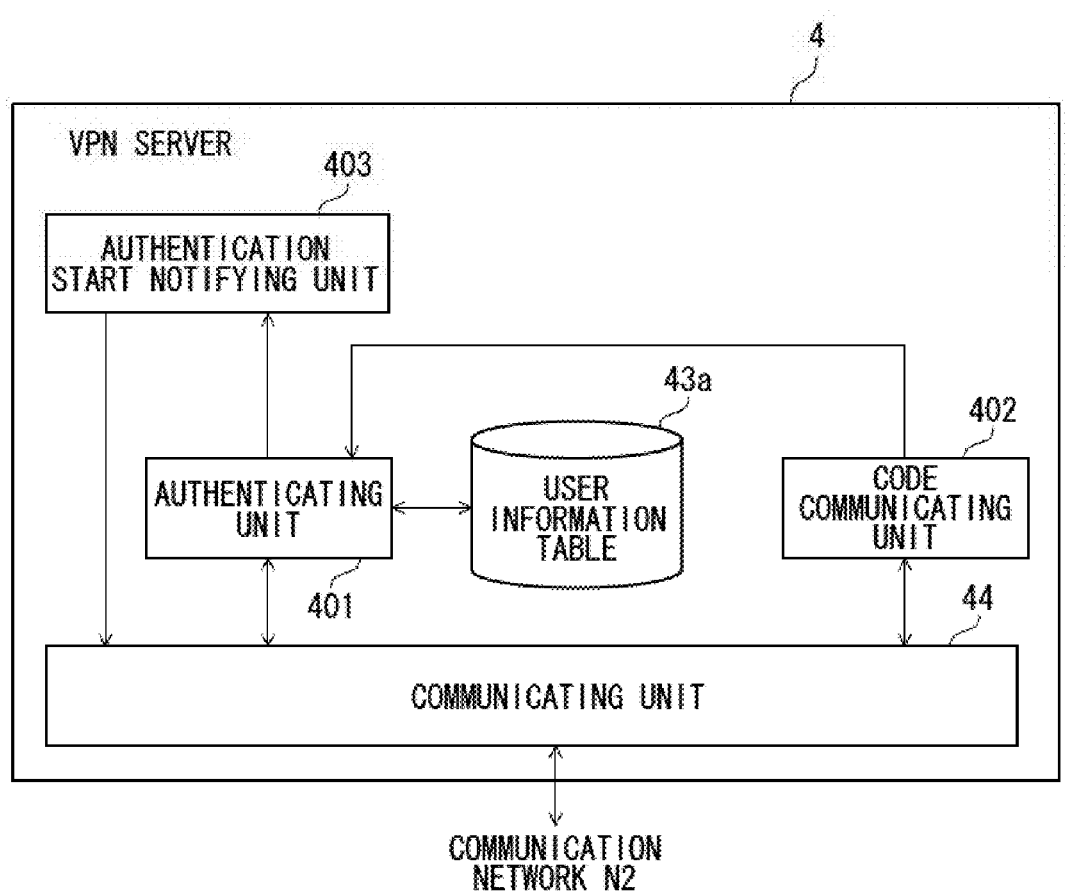
FIG. 18 illustrates a functional configuration of the VPN server according to the second embodiment.

Hereinafter, a description will be given on functions realized by the control unit 40 of the VPN server 4 by executing a control program stored in the ROM 41 or the storage unit 13 in the IP telephone system according to the present second embodiment. FIG. 18 illustrates a functional configuration of the VPN server 4 according to the second embodiment.

In the VPN server 4 according to the present second embodiment, the control unit 40 realizes the functions of an authenticating unit 401, a encrypt communicating unit 402, an authentication start notifying unit 403, and the like by executing a control program stored in the ROM 41 or the storage unit 43.

When the terminal device 2 transmits a VPN authentication request (VPN connection request) to the VPN server 4, the authenticating unit (connection request accepting unit) 401 receives the VPN authentication request. The authenticating unit 401 acquires, from the received VPN authentication request, a VPN user ID and a password of the user of the terminal device 2 having transmitted the VPN authentication request. After acquiring the VPN user ID and the password from the VPN authentication request, the authenticating unit 401 sends out the acquired VPN user ID to the authentication start notifying unit 403 before performing authentication.

When notified of the VPN user ID by the authenticating unit 401, the authentication start notifying unit (notifying unit) 403 transmits the VPN user ID to the SIP server 1 to notify that VPN authentication of the user of the VPN user ID has commenced.

After sending out the VPN user ID acquired from the VPN authentication request to the authentication start notifying unit 403, the authenticating unit 401 authenticates whether or not the VPN user ID and the password acquired from the VPN authentication request is a VPN user ID and a password of a legitimate user. The authenticating unit 401 determines whether or not the VPN user ID and the password acquired from the VPN authentication request are stored as a pair in the user information table 43a.

When the authenticating unit 401 successfully authenticates that the user of the terminal device 2 having transmitted the VPN authentication request is a legitimate user, the authenticating unit 401 notifies the encrypt communicating unit 402 as such. The encrypt communicating unit (connecting unit) 402 exchanges encryption keys and establishes a encrypted communication path in order to perform encrypted communication with the terminal device 2 of the user authenticated by the authenticating unit 401. At this point, the encrypt communicating unit 402 assigns an IP address on the communication network N1 to the terminal device 2 having transmitted the VPN authentication request, and notifies the assigned IP address to the terminal device 2 having transmitted the VPN authentication request. Accordingly, the terminal device 2 having transmitted the VPN authentication request is now able to access the communication network N1 via the VPN server 4 using the assigned IP address on the communication network N1.

The encrypt communicating unit 402 manages IP addresses on the communication network N1 which may be assigned by the VPN server 4 with respect to whether such IP addresses are already assigned to terminal devices 2 or not. When the user having transmitted the VPN authentication request is authenticated, the encrypt communicating unit 402 selects one IP address from the IP addresses not yet assigned to a terminal device 2 and assigns the selected IP address to the terminal device 2 having transmitted the VPN authentication request.

The encrypt communicating unit 402 performs encrypting or decrypting on data to be transmitted and received to and from the authenticated terminal device 2.

In the IP telephone system according to the present second embodiment, when the calling terminal 2 makes a call via the communication network N1, the SIP server 1 acquires the SIP-URI of the called terminal 2 from the call request (INVITE) received from the calling terminal 2. If the acquired SIP-URI of the called terminal 2 is registered in the registered information table 13a, the SIP server 1 transfers the call request received from the calling terminal 2 to the called terminal 2. If a successful response to the call request is made from the called terminal 2, the SIP server 1 establishes a call connection between the calling terminal 2 and the called terminal 2.

On the other hand, if the SIP-URI of the called terminal 2 acquired from the call request is not registered in the registered information table 13a, the SIP server 1 causes the unregistered terminal management table 13b to store information regarding the call (session). The SIP server 1 then transmits, to the called terminal 2, an SMS message indicating that a call request has been made, and after establishing the call between the calling terminal 2 and setting a hold state, transmits to the calling terminal 2 holding tone data indicating that the called terminal 2 is currently IP-connected. Accordingly, the user of the calling terminal 2 is able to know that the called terminal 2 is currently IP-connected.

In addition, when the SIP server 1 receives the VPN user ID of a user for which VPN authentication has commenced from the VPN server 4, the SIP server 1 acquires an SIP-URI corresponding to the received VPN user ID based on the VPN-SIP correspondence table 13e. The SIP server 1 determines whether the call state of the terminal device 2 with the acquired SIP-URI, or in other words, whether the called terminal 2 of the user for which VPN authentication has commenced is "IP connecting" based on stored contents of the unregistered terminal management table 13b.

If the call state of the called terminal 2 stored in the unregistered terminal management table 13b is "IP connecting", the SIP server 1 updates the call state of the called terminal 2 stored in the unregistered terminal management table 13b to "VPN authenticating". At this point, the SIP server 1 transmits holding tone data indicating that the called terminal 2 is currently undergoing VPN authentication to the calling terminal 2. Accordingly, the user of the calling terminal 2 is able to know that the called terminal 2 is currently undergoing VPN authentication.

In addition, when receiving the SIP registration request (REGISTER) from the called terminal 2, the SIP server 1 causes the registered information table 13a to store the IP address on the communication network N1 corresponding to the SIP-URI of the called terminal 2. At this point, the SIP server 1 determines whether or not the call state of the called terminal 2 having sent the SIP registration request is "VPN authenticating" based on the stored contents of the unregistered terminal management table 13b.

If the call state of the called terminal 2 stored in the unregistered terminal management table 13b is "VPN authenticating", the SIP server 1 updates the call state of the called terminal 2 stored in the unregistered terminal management table 13b to "Calling". At this point, the SIP server 1 begins transferring the call established between the calling terminal 2 and the SIP server 1 to the called terminal 2, and transmits holding tone data indicating that the called terminal 2 is being called to the calling terminal 2. Accordingly, the user of the calling terminal 2 is able to know that the called terminal 2 is currently being called.

In addition, if a successful response to the call request is made from the called terminal 2, the SIP server 1 concludes the call transfer processing and establishes a call connection between the calling terminal 2 and the called terminal 2.

When updating the call state of the called terminal 2 stored in the unregistered terminal management table 13b from "IP connecting" to "VPN authenticating", the SIP server 1 according to the present second embodiment determines whether or not the call state of the called terminal 2 having been notified by the VPN server 4 that VPN authentication has commenced is "IP connecting". In addition, when updating the call state of the called terminal 2 stored in the unregistered terminal management table 13b from "VPN authenticating" to "Calling", the SIP server 1 determines whether or not the call state of the called terminal 2 having transmitted the SIP registration request is "VPN authenticating". Accordingly, it is possible to determine whether the call state of the called terminal 2 to be updated is appropriate or not.

Hereinafter, processing to be performed by the SIP server 1, the terminal device 2, and the VPN server 4 in the IP telephone system according to the present second embodiment will be described with reference to a flowchart. Since the processing performed by the SIP server 1 when receiving a call request (INVITE) from the terminal device 2 in the IP telephone system according to the present second embodiment is the same as the processing described with reference to FIG. 8 in the first embodiment above, a description thereof shall be omitted.

Figure 19:
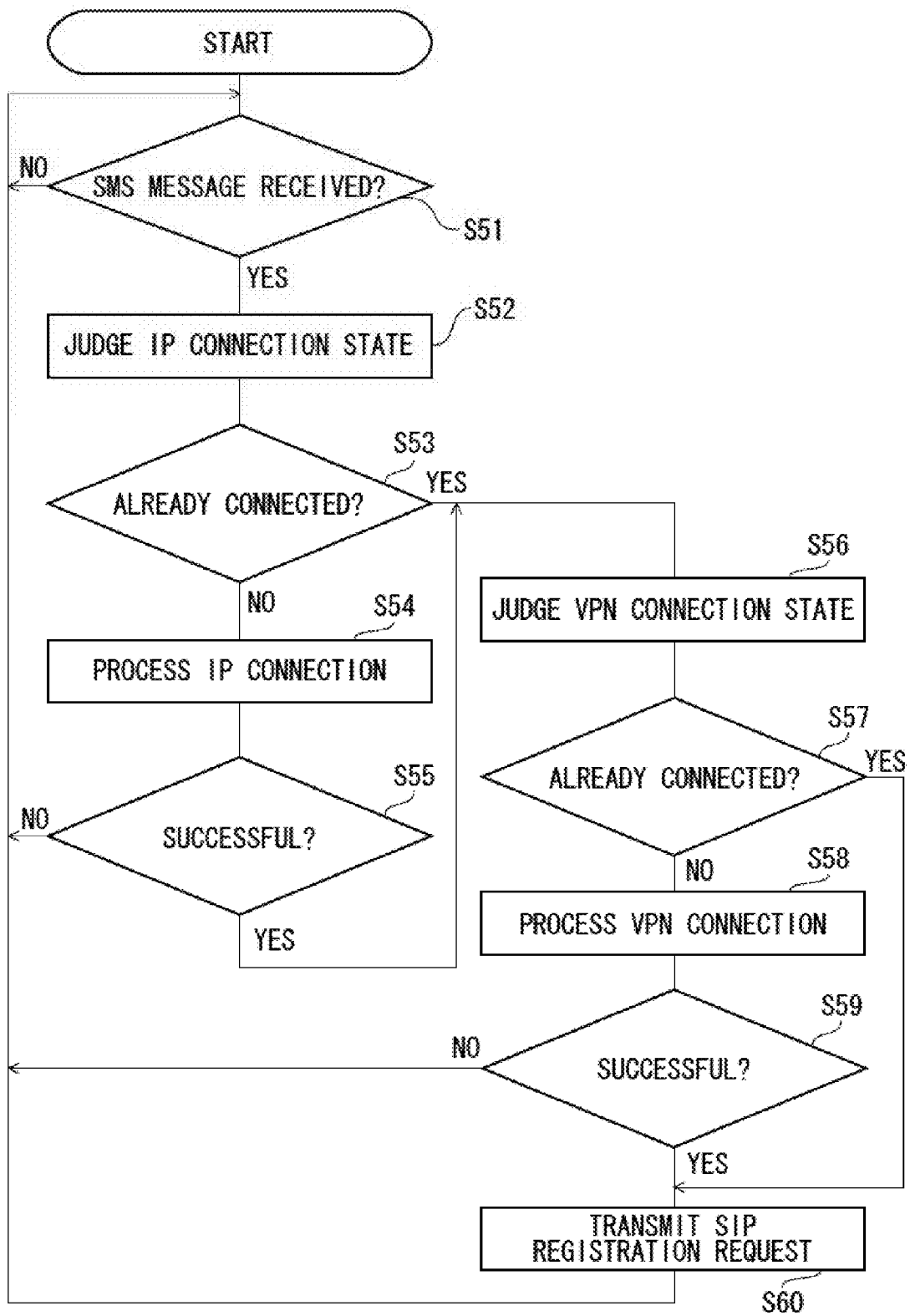
FIG. 19 illustrates processing performed by the terminal device.

Next, with reference to a flowchart, a description will be given on processing to be performed by the terminal device (called terminal) 2 when receiving, from the SIP server 1 via the SMS server 3, an SMS message indicating that a call request is being made. FIG. 19 illustrates a procedure of processing performed by the terminal device 2. The following processing is to be executed by the control unit 20 according to a control program stored in the ROM 21 or the storage unit 23 of the terminal device 2.

The control unit 20 of the terminal device 2 determines whether or not an SMS message indicating that a call request is being made has been received from the SIP server 1 (S51). When the control unit 20 determines that an SMS message indicating that a call request is being made has not been received from the SIP server 1 (S51: NO), the control unit 20 stands by until such an SMS message is received by performing normal operations. When the control unit 20 determines that an SMS message indicating that a call request is being made has been received from the SIP server 1 (S51: YES), the control unit 20 judges the IP connection state of its own terminal device 2 (S52). The control unit 20 judges whether or not an IP address on the communication network N2 has been assigned to its own terminal device 2.

When the control unit 20 judges that IP connection has not been established (S53: NO), the control unit 20 performs IP connection processing (S54). The control unit 20 requests a specific server to make an IP connection and to assign an IP address on the communication network N2 to its own terminal device 2. The control unit 20 determines whether the IP connection is successful or not (S55). When the control unit 20 determines that IP connection is unsuccessful (S55: NO) or, in other words, when an IP address on the communication network N2 has not been assigned, the control unit 20 returns to step S51.

When the control unit 20 judges that an IP connection has been made (S53: YES) or that IP connection is successful (S55: YES) or, in other words, when an IP address on the communication network N2 has been assigned, the control unit 20 determines the VPN connection state of its own terminal device (S56). The control unit 20 judges whether or not an IP address on the communication network N1 has been assigned to its own terminal device 2. When the control unit 20 judges that a VPN connection has not been established (S57: NO), the control unit 20 performs VPN connection processing (S58). The control unit 20 transmits a VPN authentication request to the VPN server 4 via the communication network N2, and requests an IP address on the communication network N1 to be assigned to its own terminal device 2.

The control unit 20 determines whether the VPN connection is successful or not (S59). When the control unit 20 determines that VPN connection is unsuccessful (S59: NO) or, in other words, when an IP address on the communication network N1 has not been assigned, the control unit 20 returns to step S51. When the control unit 20 judges that VPN connection is successful (S59: YES) or, in other words, when an IP address on the communication network N1 has been assigned or when a VPN connection has been made (S57: YES), the control unit 20 transmits an SIP registration request (REGISTER) to the SIP server 1 via the VPN server 4 (S60).

The control unit 20 VPN-packetizes an SIP registration request (REGISTER) that includes an IP address on the communication network N1 in a contact header thereof, and sends the same to the VPN server 4. Upon receiving the VPN packet from the terminal device 2, the VPN server 4 retrieves the original SIP registration request and transfers the same to the SIP server 1.

Figure 20:
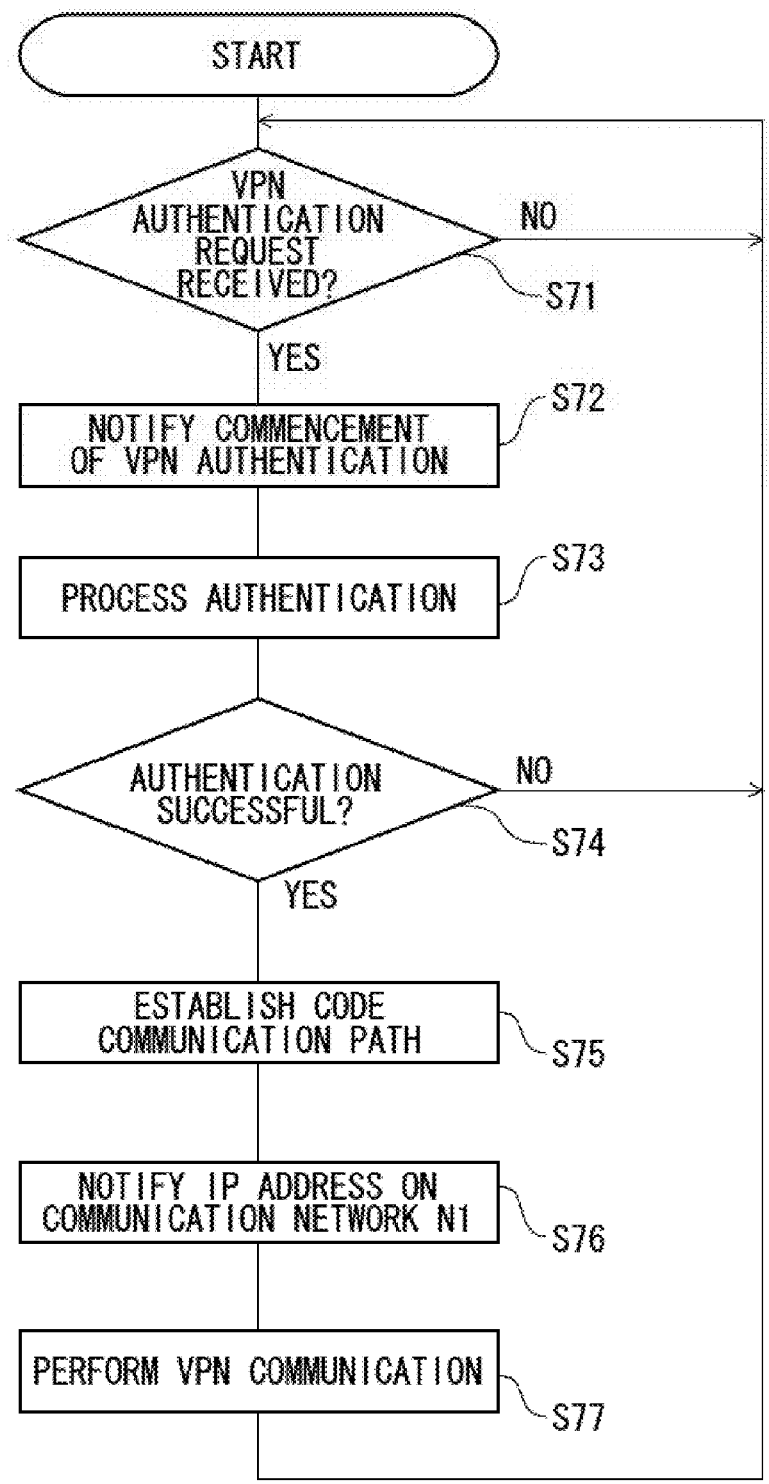
FIG. 20 illustrates processing performed by the VPN server.

Next, a description will be given with reference to a flowchart on processing performed by the VPN server 4 when receiving a VPN registration request from the terminal device 2. FIG. 20 illustrates a procedure of processing performed by the VPN server 4. The following processing is to be executed by the control unit 40 according to a control program stored in the ROM 41 or the storage unit 43 of the VPN server 4.

The control unit 40 of the VPN server 4 determines whether or not a VPN authentication request outputted by any of the terminal devices 2 has been received (S71). When the control unit 40 determines that a VPN authentication request outputted by any of the terminal devices 2 has not been received (S71: NO), the control unit 40 stands by until a VPN authentication request outputted by any of the terminal devices 2 is received by performing normal operations. When the control unit 40 determines that a VPN authentication request outputted by any of the terminal devices 2 has been received (S71: YES), the control unit 40 acquires, from the received VPN authentication request, the VPN user ID of the user of the terminal device 2 having made the VPN authentication request. The control unit 40 transmits the acquired VPN user ID to the SIP server 1, and notifies that VPN authentication of the user having the VPN user ID has commenced (S72).

The control unit 40 acquires a VPN user ID and a password of the user of the terminal device 2 having made the VPN authentication request from the received VPN authentication request, and performs authentication on the acquired VPN user ID and password (S73). When authentication is unsuccessful (S74: NO), the control unit 40 returns to step S71.

When authentication is successful (S74: YES), the control unit 40 establishes a encrypted communication path to be used by the terminal device 2 of the user (S75). The control unit 40 assigns an IP address on the communication network N1 to the terminal device 2 having transmitted the VPN authentication request, and notifies the assigned IP address to the terminal device 2 (S76). Accordingly, using the assigned IP address, the terminal device 2 having transmitted the VPN authentication request relays VPN communication to be performed via the communication network N1 (S77).

Figure 21:
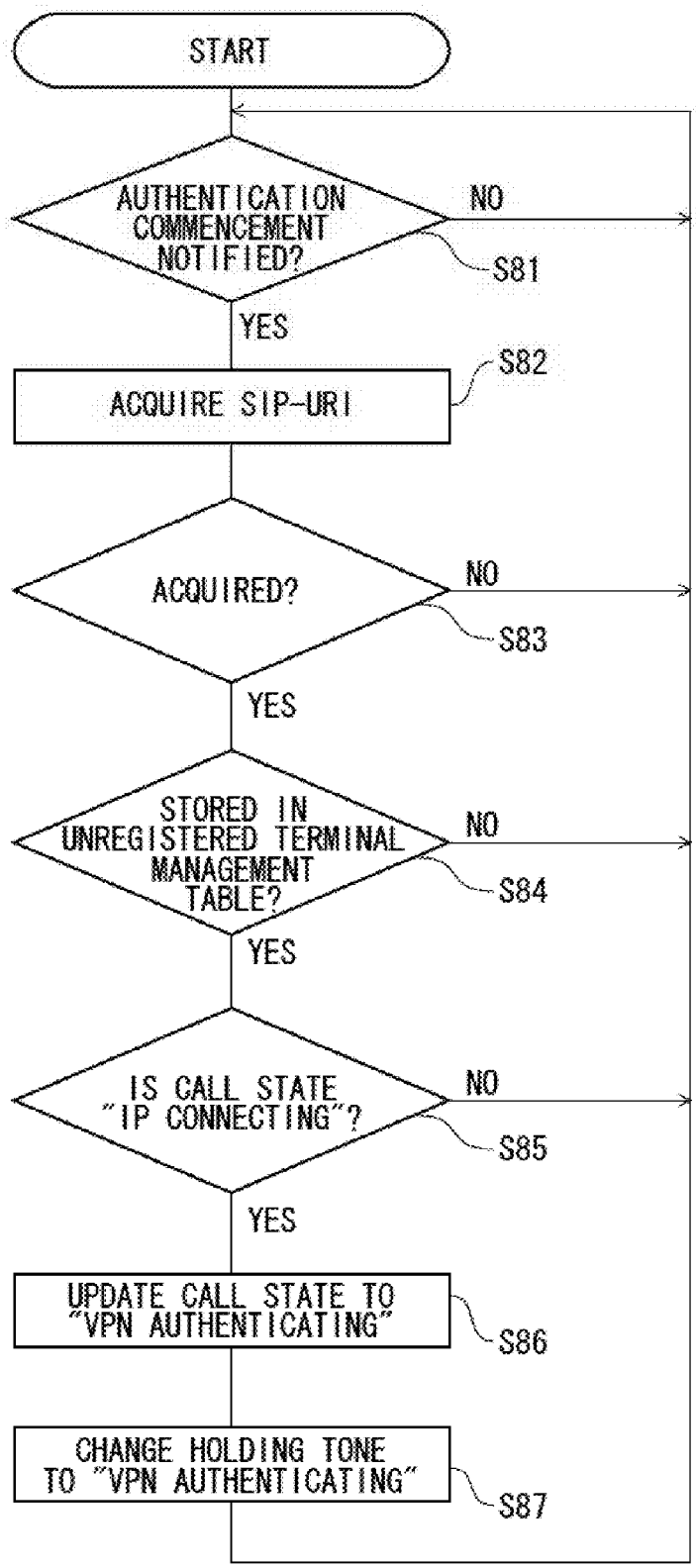
FIG. 21 illustrates processing performed by the SIP server.

Next, a description will be given with reference to a flowchart on processing to be performed by the SIP server 1 when a VPN user ID is transmitted from the VPN server 4 and a notification is received to the effect that VPN authentication of the user with the VPN user ID has commenced as described above. FIG. 21 illustrates a procedure of processing performed by the SIP server 1. The following processing is to be executed by the control unit 10 according to a control program stored in the ROM 11 or the storage unit 13 of the SIP server 1.

The control unit 10 of the SIP server 1 determines whether or not a notification has been received from the VPN server 4 to the effect that any of the users has commenced VPN authentication (S81). When the control unit 10 determines that a notification has not been received from the VPN server 4 to the effect that any of the users has commenced VPN authentication (S81: NO), the control unit 10 stands by until a notification is received from the VPN server 4 to the effect that any of the users has commenced VPN authentication by performing normal operations. When the control unit 10 determines that a notification has been received to the effect that any of the users has commenced VPN authentication (S81: YES), the control unit 10 acquires an SIP-URI stored in the VPN-SIP correspondence table 13e in correspondence to the notified VPN user ID (S82). In this case, the acquired SIP-URI is the SIP-URI of the terminal device 2 of the user with the notified VPN user ID.

The control unit 10 determines whether or not an SIP-URI corresponding to the notified VPN user ID has been acquired from the VPN-SIP correspondence table 13e (S83). When the control unit 10 determines that an SIP-URI corresponding to the notified VPN user ID was not acquired from the VPN-SIP correspondence table 13e (S83: NO), the control unit 10 returns to step S81. When the control unit 10 determines that an SIP-URI corresponding to the notified VPN user ID was acquired from the VPN-SIP correspondence table 13e (S83: YES), the control unit 10 determines whether or not the acquired SIP-URI is stored in the called party URI field of the unregistered terminal management table 13b (S84).

When the control unit 10 determines that the acquired SIP-URI is stored in the called party URI field of the unregistered terminal management table 13b (S84: YES), the control unit 10 determines whether or not the call state stored in the unregistered terminal management table 13b in correspondence with the SIP-URI is "IP connecting" (S85).

When the control unit 10 determines that the acquired SIP-URI is not stored in the called party URI field of the unregistered terminal management table 13b (S84: NO) or that the corresponding call state is not "IP connecting" (S85: NO), the control unit 10 returns to step S81.

When the control unit 10 determines that the corresponding call state is "IP connecting" (S85: YES), the control unit 10 updates the call state of the call using the SIP-URI of the terminal device 2 having made the VPN authentication request as the called party URI to "VPN authenticating" (S86). The control unit 10 changes the holding tone data to be transmitted to the calling terminal 2 of the call to holding tone data corresponding to the "VPN authenticating" call state (S87). The control unit 10 then returns to step S81.

Figure 22:
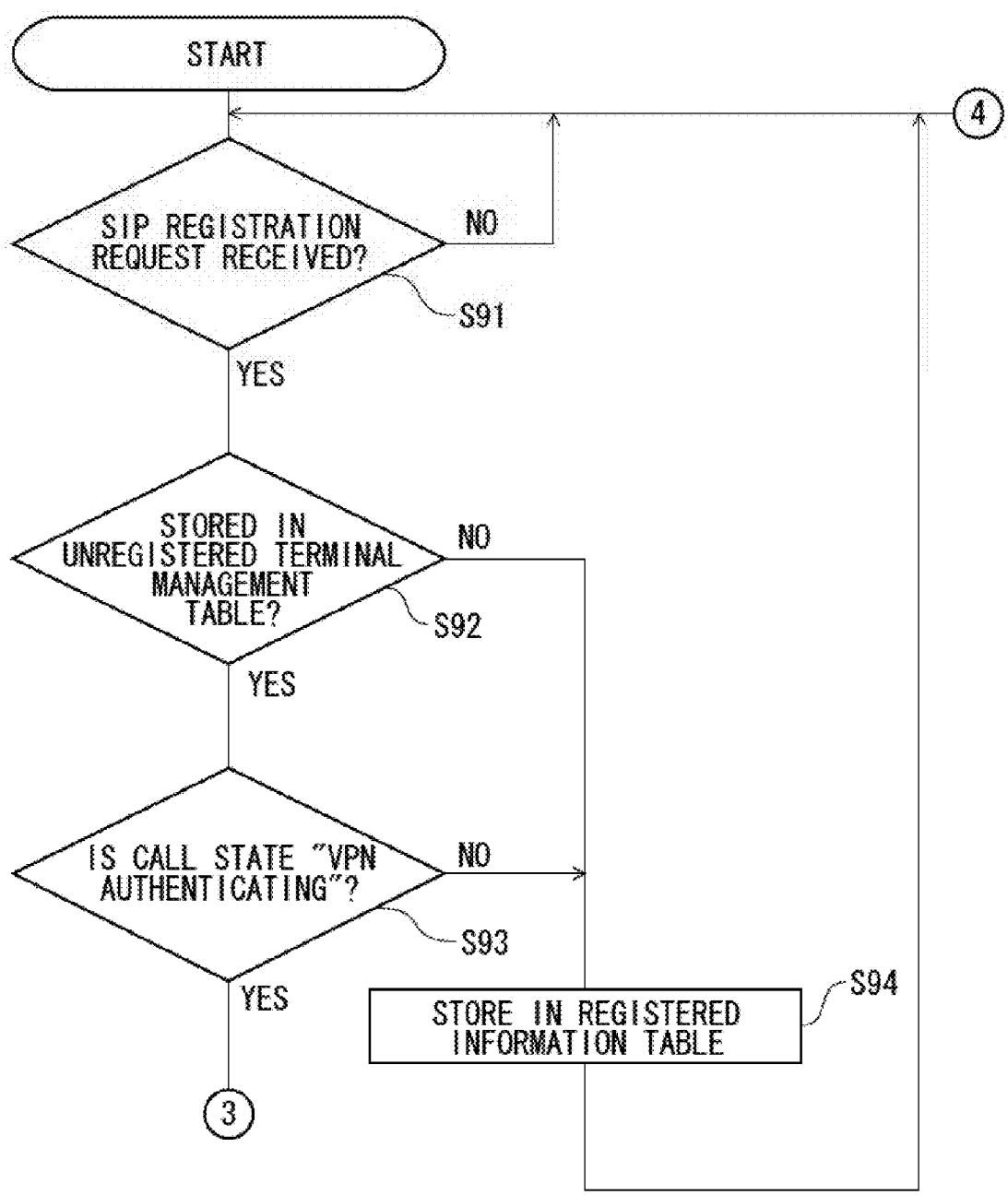
FIG. 22 illustrates processing performed by the SIP server.
Figure 23:
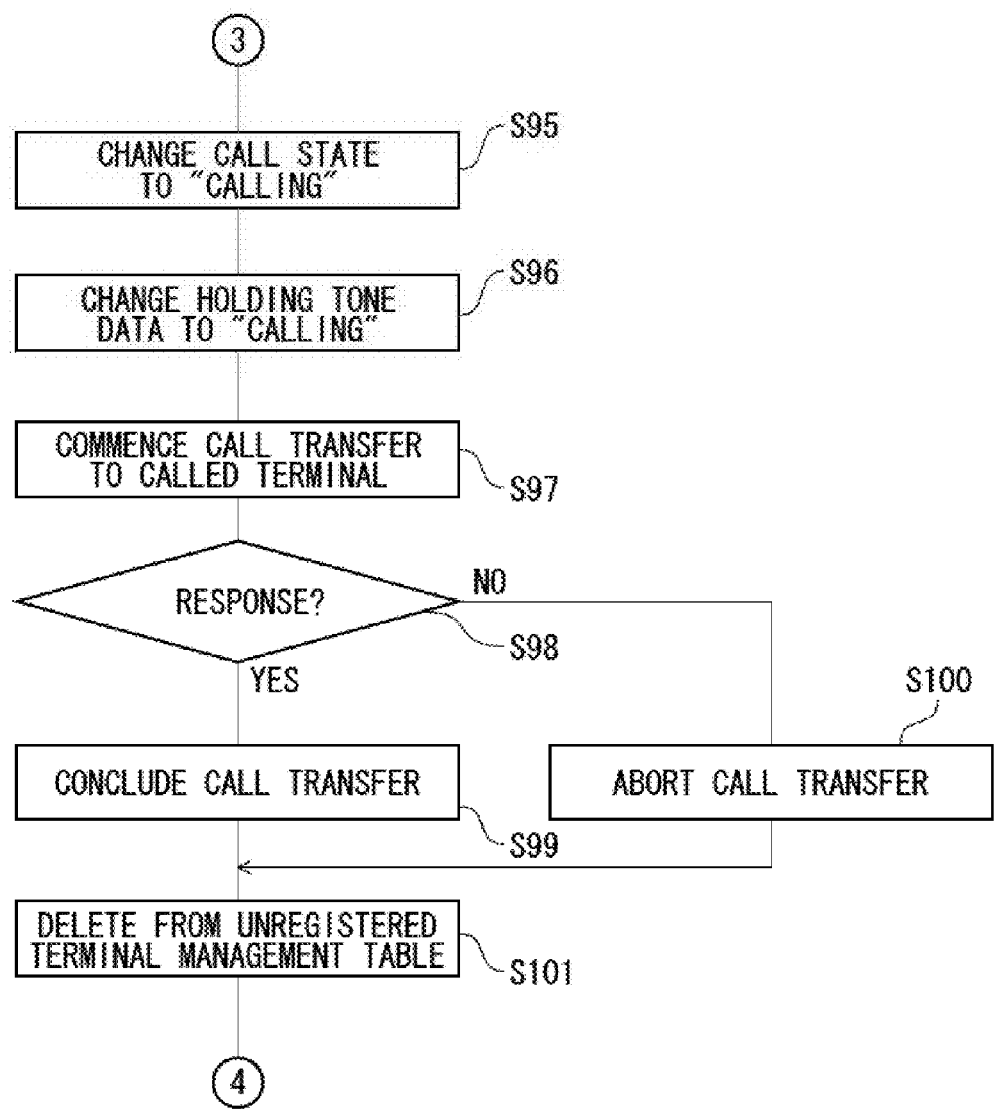
FIG. 23 illustrates processing performed by the SIP server.

Next, a description will be given with reference to flowcharts on processing performed by the SIP server 1 when receiving an SIP registration request from the terminal device 2. FIGS. 22 and 23 illustrate a procedure of processing to be performed by the SIP server 1. The following processing is to be executed by the control unit 10 according to a control program stored in the ROM 11 or the storage unit 13 of the SIP server 1.

The control unit 10 of the SIP server 1 determines whether or not an SIP registration request (REGISTER) outputted by any of the terminal devices 2 has been received (S91). When the control unit 10 determines that an SIP registration request outputted by any of the terminal devices 2 has not been received (S91: NO), the control unit 10 stands by until an SIP registration request outputted by any of the terminal devices 2 is received by performing normal operations. When the control unit 10 determines that an SIP registration request has been received (S91: YES), the control unit 10 acquires, from the received SIP registration request, the SIP-URI of the terminal device 2 having made the SIP registration request. The control unit 10 determines whether or not the acquired SIP-URI of the terminal device 2 is stored in the called party URI field of the unregistered terminal management table 13b (S92).

When the control unit 10 determines that the SIP-URI of the terminal device 2 having made the SIP registration request is stored in the called party URI field of the unregistered terminal management table 13b (S92: YES), the control unit 10 determines whether or not the call state stored in the unregistered terminal management table 13b in correspondence with the SIP-URI is "VPN authenticating" (S93).

When the control unit 10 either determines that the SIP-URI of the terminal device 2 having made the SIP registration request is not stored in the called party URI field of the unregistered terminal management table 13b (S92: NO) or determines that the corresponding call state is not "VPN authenticating" (S93: NO), the control unit 10 acquires, from the received SIP registration request, the SIP-URI and the IP address (the IP address on the communication network N1) of the terminal device 2 having made the SIP registration request. The call control unit 10 associates the acquired SIP-URI and IP address, causes the registered information table 13a to store the same (S94), and returns to step S91.

When the control unit 10 determines that the corresponding call state is "VPN authenticating" (S93: YES), the control unit 10 updates the call state of the call using the SIP-URI of the terminal device 2 having made the SIP registration request as the called party URI to "Calling" (S95). The control unit 10 changes the holding tone data to be transmitted to the calling terminal 2 of the call to holding tone data corresponding to the "Calling" call state (S96).

The control unit 10 acquires, from the received SIP registration request, the SIP-URI and the IP address (the IP address on the communication network N1) of the terminal device 2 having made the SIP registration request, associates the acquired SIP-URI and IP address, and causes the registered information table 13a to store the same. The control unit 10 then transmits a call request (INVITE) to the terminal device (called terminal) 2 having made the SIP registration request and commences call processing (call transfer) (S97).

When the control unit 10 has determined whether or not a response has been made from the called terminal 2 to which the call transfer has commenced (S98) and determines that a response has been made (S98: YES), the control unit 10 transmits transfer completion (REFER-TO) to the calling terminal 2 and concludes the call transfer (S99). Accordingly, a call connection is established between the calling terminal 2 and the called terminal 2. Once the call connection is established, the control unit 10 deletes information regarding the call from the unregistered terminal management table 13b (S101), and returns to step S91.

When the control unit 10 determines that a response has not been made from the called terminal 2 to which the call transfer has commenced (S98: NO), the control unit 10 aborts the call transfer to the called terminal 2 (S100) and terminates the call to the calling terminal 2 (BYE). When the call connection is aborted, the control unit 10 deletes information regarding the call from the unregistered terminal management table 13b (S101), and returns to step S91.

According to the processing described above, when a call request is received from the calling terminal 2, unless the called terminal 2 is not in a call-connectable state, the SIP server 1 keeps the call connection between the calling terminal 2 in a hold state until the called terminal 2 changes to a call-connectable state. The SIP server 1 then changes the holding tone to be sent to the calling terminal 2 on hold to a holding tone corresponding to the state of the called terminal 2 or, more specifically, to a holding tone that notifies "IP connecting", "VPN authenticating", "Calling", or the like. Accordingly, the user of the calling terminal 2 is able to know the state of the called terminal 2 by listening to the holding tone until the called terminal 2 changes to a call-connectable state. Therefore, based on the state of the called terminal 2, the user of the calling terminal 2 is able to appropriately determine whether to wait for a response from the called terminal 2, disconnect the connection, or the like.

In the configuration according to the present second embodiment, when the called terminal 2 is neither IP-connected nor VPN-connected, a certain amount of time is required from the moment a call request from the calling terminal 2 is received by the SIP server 1 to the moment a call connection is established between the calling terminal 2 and the called terminal 2. The call control device disclosed in the present application is capable of keeping the calling terminal 2 notified of the state of the called terminal 2 in an environment where a certain amount of time is required until a call connection is established as described above and is therefore effective.

THIRD EMBODIMENT

Hereinafter, an IP telephone system according to a third embodiment will be described. Since the IP telephone system according to the present third embodiment may be realized by the same configuration as the IP telephone system according to the first embodiment described above, similar components shall be denoted by like reference numerals and a description thereof shall be omitted.

With respect to the IP telephone system according to the first embodiment described above, the present third embodiment additionally includes processing to be performed by the SIP server 1 before a call connection is established between a calling terminal 2 and a called terminal 2 when receiving a disconnect request (BYE) from the calling terminal 2 for which call connection is placed on hold.

With a terminal device 2 for which call connection is placed on hold or a call-connected terminal device 2, when call connection is suspended by a user by operating a cancel button, the call control unit 200 of the terminal device 2 transmits a disconnect request (BYE) to the SIP server 1. When receiving a disconnect request from a terminal device 2 for which call connection is placed on hold or from a call-connected terminal device 2, the call control unit (disconnect request accepting unit) 100 of the SIP server 1 acquires an SIP-URI of the terminal device 2 from the received disconnect request. The call control unit 100 sends out the acquired SIP-URI of the terminal device 2 to the unregistered terminal call control unit 102.

When acquiring the SIP-URI of the terminal device 2 having transmitted the disconnect request from the call control unit 100, the unregistered terminal call control unit 102 determines whether or not the acquired SIP-URI of the terminal device 2 is stored in the called party URI field of the unregistered terminal management table 13b. When the acquired SIP-URI of the terminal device 2 is not stored in the called party URI field of the unregistered terminal management table 13b, the unregistered terminal call control unit 102 notifies the call control unit 100 as such. Since the disconnect request in this case is a normal disconnect request, the call control unit 100 transmits a disconnect response (200 OK) to the terminal device 2 and disconnects the call.

When the acquired SIP-URI of the terminal device 2 is stored in the called party URI field of the unregistered terminal management table 13b, the unregistered terminal call control unit 102 updates the call state of a call stored in the unregistered terminal management table (retaining unit) 13b having the acquired SIP-URI of the terminal device 2 as the called party URI to "Disconnected".

On the other hand, when receiving an SIP registration request (REGISTER) via the first communicating unit 14 or the second communicating unit 15, the call control unit 100 according to the present third embodiment acquires an SIP-URI of the terminal device 2 having made the SIP registration request from the received SIP registration request, and sends out the acquired SIP-URI to the unregistered terminal call control unit 102.

The unregistered terminal call control unit 102 searches among stored contents of the unregistered terminal management table 13b, and determines whether or not the SIP-URI acquired from the call control unit 100 is stored in a called party URI field of the unregistered terminal management table 13b. The absence of the SIP-URI acquired from the call control unit 100 from the called party URI field of the unregistered terminal management table 13b means that the SIP registration request is a normal SIP registration request. Accordingly, the unregistered terminal call control unit 102 notifies the call control unit 100 as such.

On the other hand, if the SIP-URI acquired from the call control unit 100 is stored in the called party URI field of the unregistered terminal management table 13b, the unregistered terminal call control unit (adequacy judging unit) 102 determines whether or not the call state stored in the unregistered terminal management table 13b in correspondence with the SIP-URI is "IP connecting". Accordingly, the unregistered terminal call control unit 102 judges whether or not the call state of the terminal device 2 whose SIP-URI has been acquired from the call control unit 100 is appropriate with respect to the call state already stored in the unregistered terminal management table 13b.

When the corresponding call state is not "IP connecting", the unregistered terminal call control unit 102 according to the present third embodiment 3 determines whether or not the corresponding call state is "Disconnected". If the corresponding call state is not "Disconnected", the SIP registration request is judged to be a normal SIP registration request and the unregistered terminal call control unit 102 notifies the call control unit 100 as such. In this case also, the call control unit 100 acquires, from the received SIP registration request, the SIP-URI and the IP address of the terminal device 2 that made the SIP registration request, associates the acquired SIP-URI and IP address, and causes the registered information table 13a to store the same.

If the corresponding call state is "Disconnected", the unregistered terminal call control unit 102 acquires a calling party URI and a called party URI stored in the unregistered terminal management table 13b in correspondence to the call state. The unregistered terminal call control unit 102 transmits an INVITE using the called party URI acquired by the call control unit (incoming call notifying unit) 100 as the destination and the acquired calling party URI as the source. Accordingly, the fact that there was an incoming call from the calling terminal 2 may be retained in the called terminal 2 as incoming call history.

When the called terminal 2 having received the INVITE returns a provisional response (100 Trying, 180 Ringing, and the like) or a successful response (200 OK and the like), the call control unit 100 immediately transmits a disconnect request (BYE) to the called terminal 2. Accordingly, the SIP server 1 is now able to perform calling processing on the called terminal 2 in a short period of time. In addition, the call control unit 100 instructs the unregistered terminal call control unit 102 to delete information regarding the session to the called terminal 2 from the unregistered terminal management table 13b. Accordingly, information on each session for which communication has been terminated may be reliably deleted from the unregistered terminal call control unit 102.

When the called terminal 2 having received the INVITE does not return a provisional response (100 Trying, 180 Ringing, and the like) or a successful response (200 OK and the like), the call control unit 100 transmits a cancel request (CANCEL) to the called terminal 2 and terminates communication. In addition, the call control unit 100 instructs the unregistered terminal call control unit 102 to delete information regarding the session to the called terminal 2 from the unregistered terminal management table 13b.

According to the processing described above, even when a disconnect request is transmitted from the calling terminal 2 from the moment a call is made by the calling terminal 2 to the moment a call connection is established, the incoming call from the calling terminal 2 may be retained in the incoming call history of the called terminal 2. Therefore, the fact that there was an incoming call from the calling terminal 2 may be notified to the called terminal 2 even when a call connection has not been established between the calling terminal 2.

Figure 24:
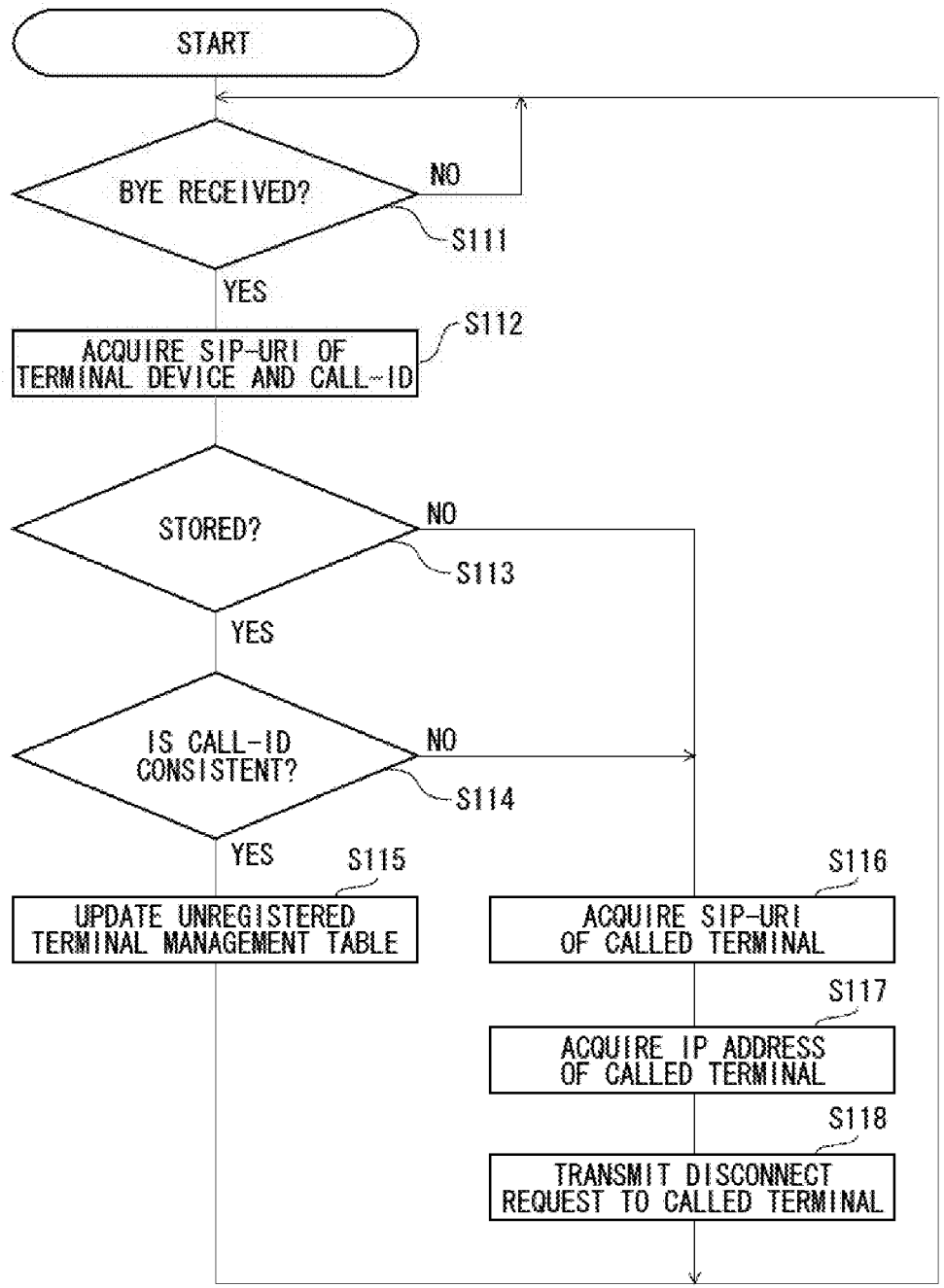
FIG. 24 illustrates processing performed by the SIP server.

Hereinafter, a description will be given with reference to a flowchart on processing to be performed by the SIP server 1 in the IP telephone system according to the present third embodiment when receiving a disconnect request (BYE) from the terminal device 2. FIG. 24 is a flowchart illustrating a procedure of processing performed by the SIP server 1. The following processing is to be executed by the control unit 10 according to a control program stored in the ROM 11 or the storage unit 13 of the SIP server 1.

The control unit 10 of the SIP server 1 determines whether or not a disconnect request (BYE) outputted by any of the terminal devices 2 has been received (S111). When the control unit 10 determines that a disconnect request outputted by any of the terminal devices 2 has not been received (S111: NO), the control unit 10 stands by until a disconnect request (BYE) outputted by any of the terminal devices 2 is received by performing normal operations. When the control unit 10 determines that a disconnect request has been received (S111: YES), the control unit 10 acquires, from the received disconnect request, an SIP-URI of the terminal device 2 having transmitted the disconnect request and a Call-ID (S112).

The control unit 10 determines whether or not the acquired SIP-URI of the terminal device 2 is stored in the calling party URI field of the unregistered terminal management table 13b (S113). When the control unit 10 determines that the acquired SIP-URI of the terminal device 2 is stored in the calling party URI field of the unregistered terminal management table 13b (S113: YES), the control unit 10 determines whether or not the acquired Call-ID is consistent with a value stored in the call ID field of the unregistered terminal management table 13b (S114). When the control unit 10 determines that the acquired Call-ID is consistent with the value stored in the call ID field of the unregistered terminal management table 13b (S114: YES), the control unit 10 updates the call state of a call stored having the acquired SIP-URI of the terminal device 2 as the calling party URI in the unregistered terminal management table 13b to "Disconnected" (S115). The control unit 10 then returns to step S111.

When the control unit 10 determines that the acquired SIP-URI of the terminal device 2 is not stored in the calling party URI field of the unregistered terminal management table 13b (S113: NO) or that the acquired Call-ID is inconsistent with the value stored in the call ID field of the unregistered terminal management table 13b (S114: NO), the control unit 10 acquires, from the received disconnect request, the SIP-URI of the called terminal 2 that is the destination of the disconnect request (S116). The control unit 10 acquires an IP address stored in the registered information table 13a in correspondence with the acquired SIP-URI or, in other words, the IP address of the called terminal 2 that is the destination of the disconnect request (S117). Using the acquired IP address, the control unit 10 transfers the disconnect request (BYE) to the called terminal 2 (S118) and returns to step S111.

Figure 25:
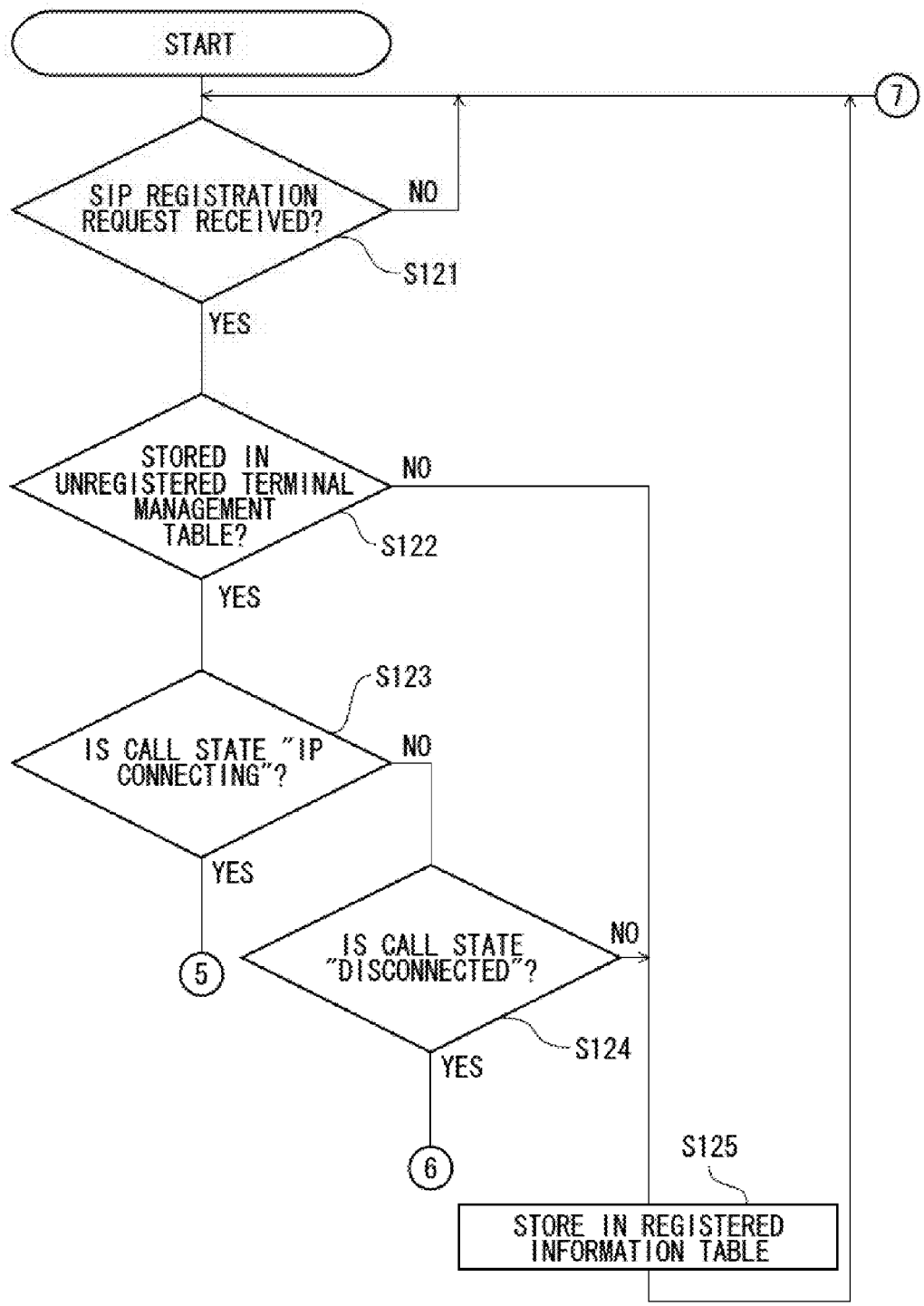
FIG. 25 illustrates processing performed by the SIP server.
Figure 26:
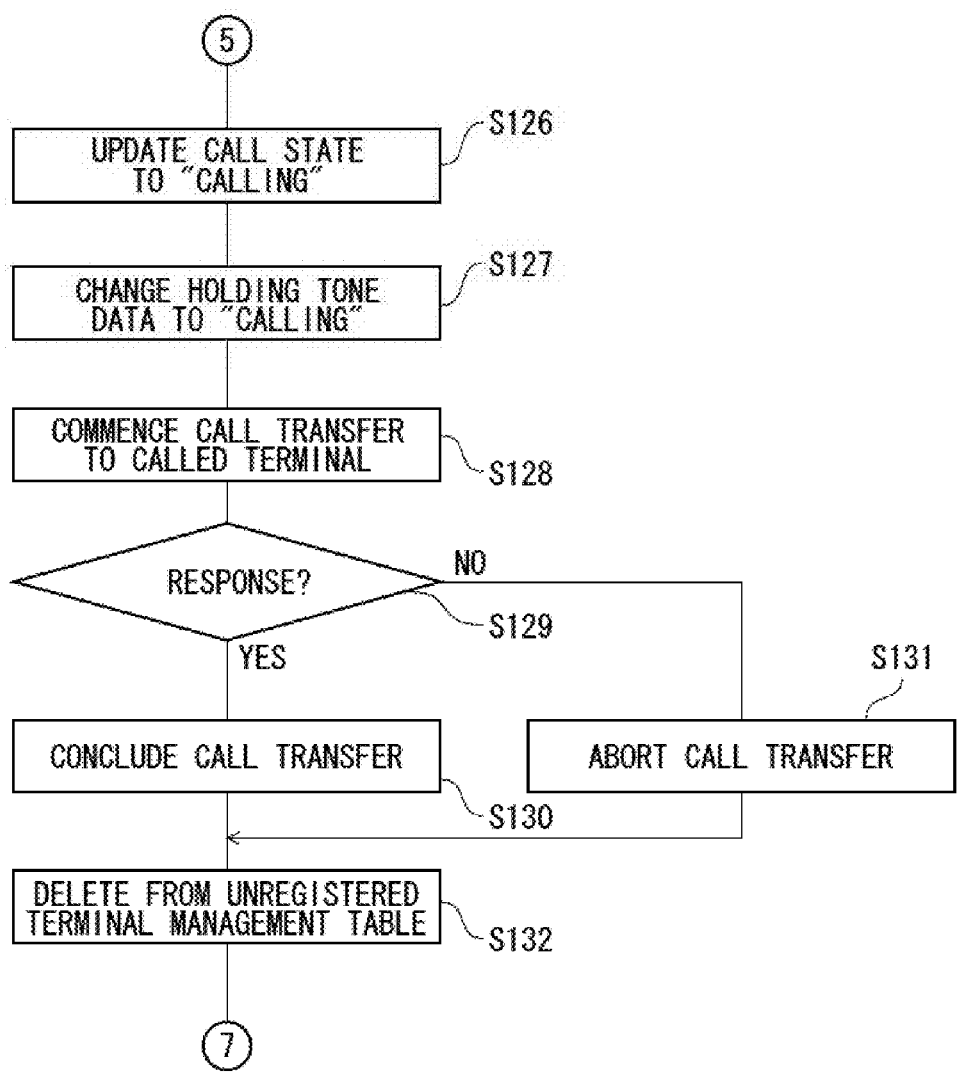
FIG. 26 illustrates processing performed by the SIP server.
Figure 27:
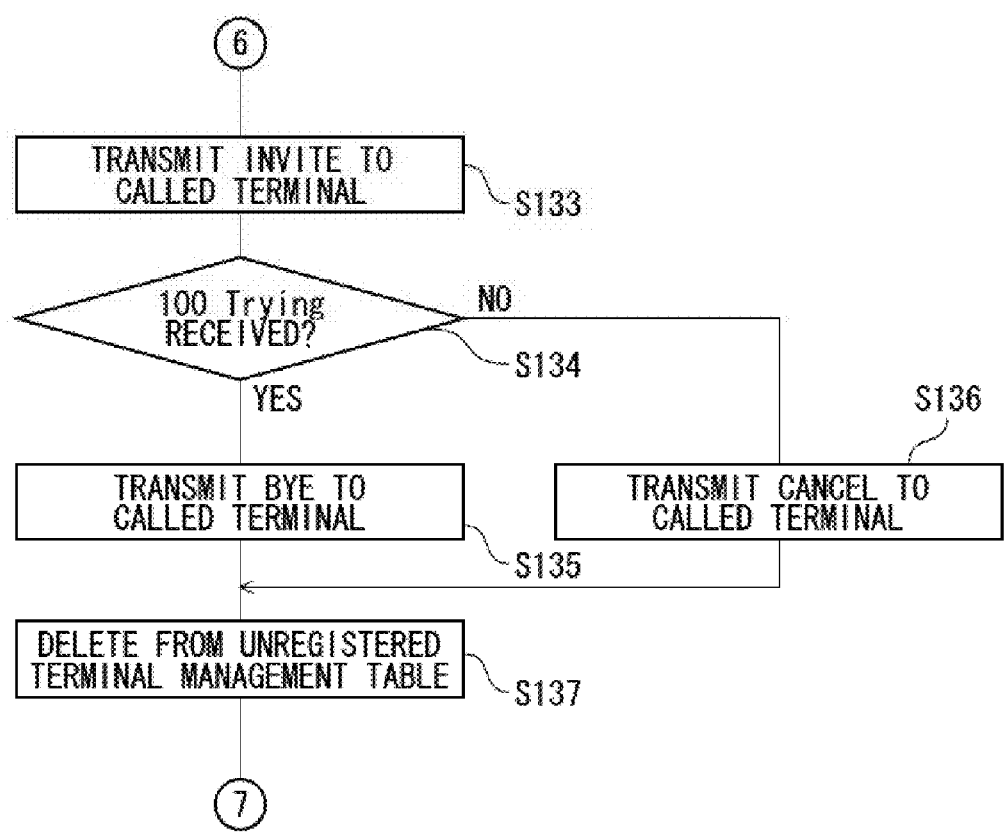
FIG. 27 illustrates processing performed by the SIP server.

Next, a description will be given with reference to flowcharts on processing performed by the SIP server 1 when receiving an SIP registration request from the terminal device 2. FIGS. 25, 26, and 27 illustrate a procedure of processing to be performed by the SIP server 1. The following processing is to be executed by the control unit 10 according to a control program stored in the ROM 11 or the storage unit 13 of the SIP server 1.

The control unit 10 of the SIP server 1 determines whether or not an SIP registration request (REGISTER) outputted by any of the terminal devices 2 has been received (S121). When the control unit 10 determines that an SIP registration request outputted by any of the terminal devices 2 has not been received (S121: NO), the control unit 10 stands by until such a call request is received by performing normal operations. When the control unit 10 determines that an SIP registration request outputted by any of the terminal devices 2 has been received (S121: YES), the control unit 10 acquires, from the received SIP registration request, the SIP-URI of the terminal device 2 having made the SIP registration request. The control unit 10 determines whether or not the acquired SIP-URI of the terminal device 2 is stored in the called party URI field of the unregistered terminal management table 13b (S122).

When the control unit 10 determines that the SIP-URI of the terminal device 2 having made the SIP registration request is stored in the called party URI field of the unregistered terminal management table 13b (S122: YES), the control unit 10 determines whether or not the call state stored in the unregistered terminal management table 13b in correspondence with the SIP-URI is "IP connecting" (S123).

When the control unit 10 determines that the corresponding call state is not "IP connecting" (S123: NO), the control unit 10 determines whether or not the corresponding call state is "Disconnected" (S124). When the control unit 10 either determines that the SIP-URI of the terminal device 2 having made the SIP registration request is not stored in the called party URI field of the unregistered terminal management table 13b (S122: NO) or determines that the corresponding call state is not "Disconnected" (S124: NO), the control unit 10 acquires, from the received SIP registration request, the SIP-URI and the IP address of the terminal device 2 having made the SIP registration request. The call control unit 10 associates the acquired SIP-URI and IP address, causes the registered information table 13a to store the same (S125), and returns to step S121.

When the control unit 10 determines that the corresponding call state is "IP connecting" (S123: YES), the control unit 10 updates the call state of the call using the SIP-URI of the terminal device 2 having made the SIP registration request as the called party URI to "Calling" (S126). The control unit 10 changes the holding tone data to be transmitted to the calling terminal 2 of the call to holding tone data corresponding to the "Calling" call state (S127).

The call control unit 10 acquires, from the received SIP registration request, the SIP-URI and the IP address of the terminal device 2 having made the SIP registration request, associates the acquired SIP-URI and IP address, and causes the registered information table 13a to store the same. The control unit 10 then transmits a call request (INVITE) to the terminal device (called terminal) 2 having made the SIP registration request and commences call processing (call transfer) (S128).

The control unit 10 determines whether or not a response has been made from the called terminal 2 to which the call transfer has commenced (S129). When the control unit 10 determines that a response has been made from the called terminal 2 to which the call transfer has commenced (S129: YES), the control unit 10 transmits transfer completion (REFER-TO) to the calling terminal 2 and concludes the call transfer (S130). Accordingly, a call connection is established between the calling terminal 2 and the called terminal 2. Once the call connection is established, the control unit 10 deletes information regarding the call from the unregistered terminal management table 13b (S132), and returns to step S121.

When the control unit 10 determines that a response has not been made from the called terminal 2 to which the call transfer has commenced (S129: NO), the control unit 10 aborts the call transfer to the called terminal 2 (S131) and terminates the connection with the calling terminal 2. When the call connection is aborted, the control unit 10 deletes information regarding the call from the unregistered terminal management table 13b (S132), and returns to step S121.

When the control unit 10 determines that the corresponding call state is "Disconnected" (S124: YES), the control unit 10 acquires a calling party URI and a called party URI stored in the unregistered terminal management table 13b in correspondence to the call state. The control unit 10 transmits an INVITE using the acquired called party URI as the destination and the acquired calling party URI as the source (S133). Accordingly, the fact that there was an incoming call from the calling terminal 2 may be retained in the called terminal 2 as incoming call history.

The control unit 10 determines whether or not a provisional response (100 Trying, 180 Ringing, and the like) or a successful response (200 OK and the like) has been received from the called terminal 2 in response to the INVITE transmitted in step S133. When the control unit 10 determines that a provisional response or a successful response has been received from the called terminal 2 (S134: YES), the control unit 10 transmits a disconnect request (BYE) to the called terminal 2 (S135). The control unit 10 deletes information regarding the call to the called terminal 2 from the unregistered terminal management table 13b (S137), and returns to step S121.

When the control unit 10 determines that a provisional response or a successful response has not been received from the called terminal 2 (S134: NO), the control unit 10 transmits a cancel request (CANCEL) to the called terminal 2 (S136). The control unit 10 deletes information regarding the call to the called terminal 2 from the unregistered terminal management table 13b (S137), and returns to step S121.

According to the above processing, in the present third embodiment, the fact that there was an incoming call from the calling terminal 2 may be recorded in the incoming call history of the called terminal 2 even when the calling terminal 2 having made the call makes a disconnect request before a call connection is established with the called terminal 2. Therefore, the user of the called terminal 2 is able to know who the incoming call was from and determine whether to call the calling terminal 2 back or the like.

While the present third embodiment has been described as a modification of the first embodiment described above, the present third embodiment may also be applied to the second embodiment described above.

THIRD EMBODIMENT

Hereinafter, an IP telephone system according to a fourth embodiment will be described. Since the IP telephone system according to the present fourth embodiment may be realized by the same configuration as the IP telephone system according to the first embodiment described above, similar components shall be denoted by like reference numerals and a description thereof shall be omitted.

In the third embodiment described above, when the SIP server 1 receives a disconnect request (BYE) from the calling terminal 2 for which call connection is put on hold before a call connection is established between the calling terminal 2 and the called terminal 2, the SIP server 1 records the fact that there was an incoming call from the calling terminal 2 in the incoming call history of the called terminal 2.

In the present fourth embodiment, when the SIP server 1 receives a disconnect request (BYE) from the calling terminal 2 for which call connection is put on hold before a call connection is established between the calling terminal 2 and the called terminal 2, the SIP server 1 transmits an SMS message indicating cancellation of the call connection to the called terminal 2.

With a terminal device 2 for which call connection is placed on hold or a call-connected terminal device 2, when call connection is suspended by a user by operating a cancel button, the call control unit 200 of the terminal device 2 transmits a disconnect request (BYE) to the SIP server 1. When receiving a disconnect request from a terminal device 2 for which call connection is placed on hold or from a call-connected terminal device 2, the call control unit 100 of the SIP server 1 acquires an SIP-URI of the terminal device 2 from the received disconnect request. The call control unit 100 sends out the acquired SIP-URI of the terminal device 2 to the unregistered terminal call control unit 102.

When acquiring the SIP-URI of the terminal device 2 having transmitted the disconnect request from the call control unit 100, the unregistered terminal call control unit 102 determines whether or not the acquired SIP-URI of the terminal device 2 is stored in the called party URI field of the unregistered terminal management table 13b. When the acquired SIP-URI of the terminal device 2 is not stored in the called party URI field of the unregistered terminal management table 13b, the unregistered terminal call control unit 102 notifies the call control unit 100 as such. In this case, the call control unit 100 transmits a disconnect response (200 OK) to the terminal device 2 and disconnects the call.

When the acquired SIP-URI of the terminal device 2 is stored in the called party URI field of the unregistered terminal management table 13b, the unregistered terminal call control unit 102 acquires the called party URI of a call stored in the unregistered terminal management table 13b having the acquired SIP-URI of the terminal device 2 as the calling party URI. The unregistered terminal call control unit 102 requests the SMS coordinating unit 103 to transmit an SMS message indicating that call connection has been cancelled to the terminal device (called terminal) 2 of the acquired called party URI.

Pursuant to the request by the unregistered terminal call control unit 102, the SMS coordinating unit (disconnect notifying unit) 103 requests the SMS server 3 to transmit an SMS message indicating that call connection has been cancelled to the called terminal 2 of the called party URI acquired from the unregistered terminal management table 13b. The SMS coordinating unit 103 then notifies the unregistered terminal call control unit 102 that a request for an SMS message transmission to the called terminal 2 has been made.

When notified by the SMS coordinating unit 103 that a request for transmitting an SMS message to the called terminal 2 has been made, the unregistered terminal call control unit 102 deletes information on the session to the called terminal 2 from the unregistered terminal management table 13b.

Pursuant to the request by the SMS coordinating unit 103, the SMS server 3 transmits an SMS message indicating that call connection has been cancelled to the called terminal 2. Methods for notifying the called terminal 2 that call connection has been cancelled need not be limited to an SMS message and, for example, a paging function may be used in the case of a WiMAX standard terminal device 2.

According to the processing described above, in the present fourth embodiment, when a disconnect request is transmitted from the calling terminal 2 from the moment a call is made by the calling terminal 2 until the moment a call connection is established, the called terminal 2 is notified of cancellation of the call connection by an SMS message. The called terminal 2 having received such an SMS message cancels various processing for establishing a call connection with the calling terminal 2. Accordingly, unnecessary IP connection processing, VPN connection processing, and the like by the called terminal 2 may be reduced.

Figure 28:
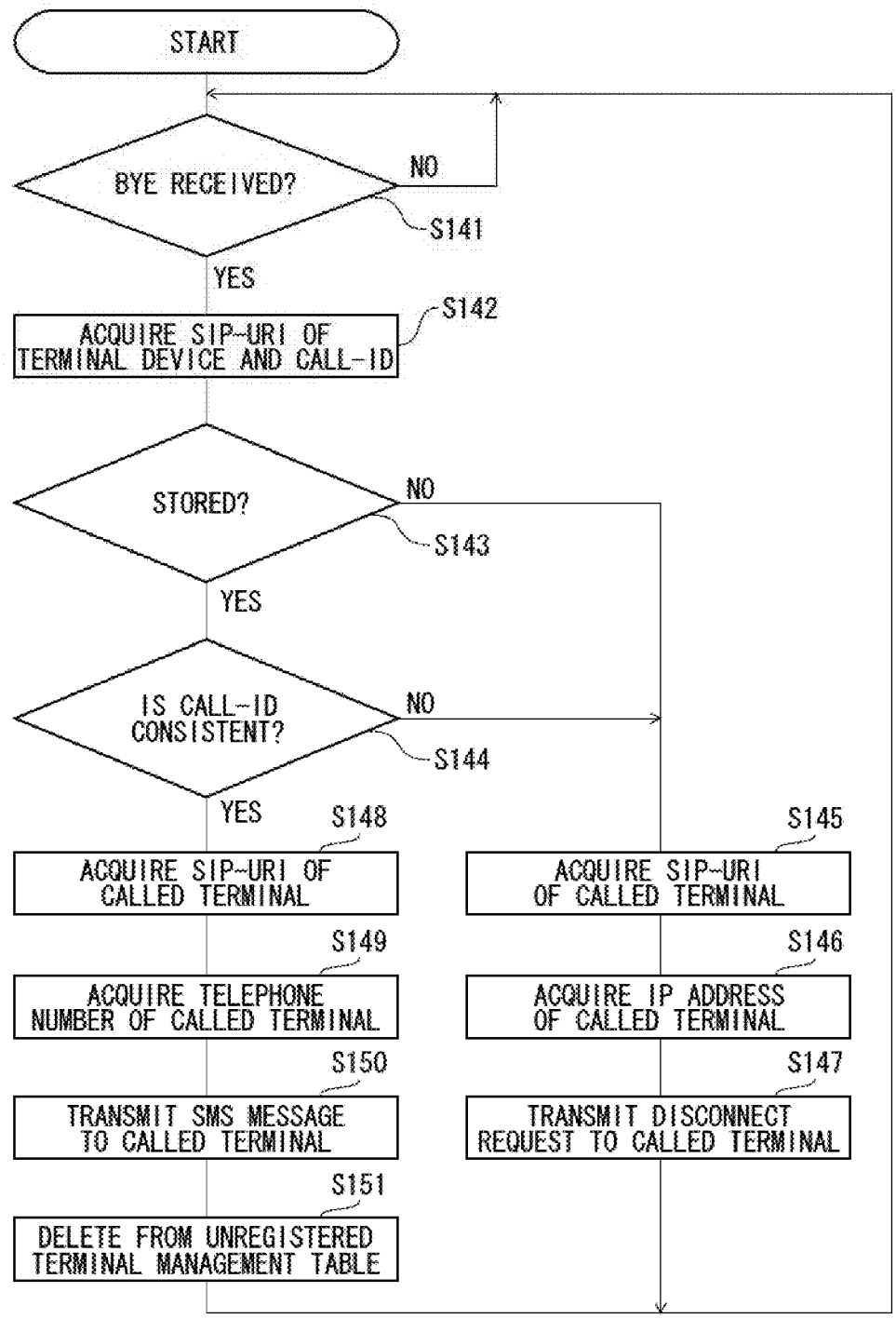
FIG. 28 illustrates processing performed by the SIP server.

Hereinafter, a description will be given with reference to a flowchart on processing to be performed by the SIP server 1 in the IP telephone system according to the present fourth embodiment when receiving a disconnect request (BYE) from the terminal device 2. FIG. 28 illustrates a procedure of processing performed by the SIP server 1. The following processing is to be executed by the control unit 10 according to a control program stored in the ROM 11 or the storage unit 13 of the SIP server 1.

The control unit 10 of the SIP server 1 determines whether or not a disconnect request (BYE) outputted by any of the terminal devices 2 has been received (S141). When the control unit 10 determines that a disconnect request outputted by any of the terminal devices 2 has not been received (S141: NO), the control unit 10 stands by until such a call request is received by performing normal operations. When the control unit 10 determines that a disconnect request has been received from any of the terminal devices 2 (S141: YES), the control unit 10 acquires, from the received disconnect request, an SIP-URI of the terminal device 2 having transmitted the disconnect request and a Call-ID (S142).

The control unit 10 determines whether or not the acquired SIP-URI of the terminal device 2 is stored in the calling party URI field of the unregistered terminal management table 13b (S143). When the control unit 10 determines that the acquired SIP-URI of the terminal device 2 is stored in the calling party URI field of the unregistered terminal management table 13b (S143: YES), the control unit 10 determines whether or not the acquired Call-ID is consistent with a value stored in the call ID field of the unregistered terminal management table 13b (S144). When the control unit 10 determines that the acquired Call-ID is consistent with a value stored in the call ID field of the unregistered terminal management table 13b (S144: YES), the control unit 10 acquires, from the received disconnect request, an SIP-URI of the called terminal 2 that is the destination of the disconnect request (S148).

The control unit 10 acquires a telephone number stored in the number management table 13c in correspondence with the acquired SIP-URI or, in other words, the telephone number of the called terminal 2 that is the destination of the disconnect request (S149). Based on the acquired telephone number, the control unit 10 transmits an SMS message indicating that the call connection has been cancelled to the called terminal 2 (S150). The control unit 10 deletes information regarding the call to the called terminal 2 from the unregistered terminal management table 13*b* (S151), and returns to step S141.

When the control unit 10 determines that the acquired SIP-URI of the terminal device 2 is not stored in the calling party URI field of the unregistered terminal management table 13*b* (S143: NO) or that the acquired Call-ID is inconsistent with the value stored in the call ID field of the unregistered terminal management table 13*b* (S144: NO), the control unit 10 acquires, from the received disconnect request, the SIP-URI of the called terminal 2 that is the destination of the disconnect request (S145). The control unit 10 acquires an IP address stored in the registered information table 13*a* in correspondence with the acquired SIP-URI or, in other words, the IP address of the called terminal 2 that is the destination of the disconnect request (S146). Using the acquired IP address, the control unit 10 transfers the disconnect request (BYE) to the called terminal 2 (S147) and returns to step S141.

According to the above processing, in the present fourth embodiment, the fact that the call connection was cancelled may be notified to the called terminal 2 using an SMS message even when the calling terminal 2 having made the call makes a disconnect request before a call connection is established with the called terminal 2. Therefore, since the called terminal 2 does not perform various processing for establishing a call connection with the calling terminal 2 after being notified of the cancellation of the call connection, the execution of unnecessary processing may be reduced.

While the present fourth embodiment has been described as a modification of the first embodiment described above, the present fourth embodiment may also be applied to the second embodiment described above.

The first to fourth embodiments described above merely exemplify a portion of an unlimited number of possible embodiments of the present application, and configurations such as various hardware and software may be suitably designed depending on the intend purpose.

In the present embodiment, when a calling user makes a call using his or her own terminal device, the calling user is able to know the state of a called terminal device even before calling processing on the called terminal device is commenced. Therefore, since the calling user is able to determine whether to wait for a called user to answer the phone or to give up the connection, improved convenience is achieved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A call control device which controls call connections between a plurality of terminal devices, the call control device comprising:

a device information storage unit that stores device information on call-connectable terminal devices;

a call request accepting unit that accepts a call request from a first terminal device to a second terminal device;

a determining unit that determines, when the call request accepting unit accepts a call request, whether the device information of the second terminal device is stored in the device information storage unit;

a holding unit that holds a call state of the first terminal device when the determining unit determines that device information on the second terminal device is not stored in the device information storage unit;

a state acquiring unit that acquires state information indicating a state of the second terminal device; and a holding tone setting unit that sets a holding tone to be transmitted to the first terminal device when the state information acquired by the state acquiring unit indicates that the state of the second terminal device is in the process of establishing an Internet Protocol connection, authenticating a Virtual Private Network, or communicating with the call control device.

2. The call control device according to claim 1, wherein the state acquiring unit acquires state information indicating the state of the second terminal device from the second terminal device.

3. The call control device according to claim 1 which communicates with the second terminal device via a relay device, wherein the state acquiring unit acquires state information indicating the state of the second terminal device from the relay device.

4. The call control device according to claim 1, further comprising:

a notifying unit that notifies the second terminal device that a call request has been accepted when the determining unit determines that the device information on the second terminal device is not stored in the device information storage unit;

a device information acquiring unit that acquires device information on the second terminal device;

a storage control unit that causes the device information storage unit to store device information acquired by the device information acquiring unit;

a calling unit that performs calling processing on the second terminal device based on the device information that the storage control unit had caused the device information storage unit to store;

a disconnect request accepting unit that accepts a disconnect request from a terminal device whose call state is placed on hold by the holding unit;

a retaining unit that retains the device information on the first terminal device when the disconnect request accepting unit accepts a disconnect request from the first terminal device whose call state is placed on hold by the holding unit before the device information acquiring unit acquires device information on the second terminal device; and an incoming call notifying unit that notifies the second terminal device that there is an incoming call from the first terminal device when the device information acquiring unit acquires the device information on the second terminal device in a state where the retaining unit is retaining device information on the first terminal device.

5. The call control device according to claim 1, further comprising:

a notifying unit that notifies the second terminal device that a call request has been accepted when the determining unit determines that the device information on the second terminal device is not stored in the device information storage unit;

a device information acquiring unit that acquires device information on the second terminal device;

a storage control unit that causes the device information storage unit to store device information acquired by the device information acquiring unit;

a calling unit that performs calling processing on the second terminal device based on the device information that the storage control unit had caused the device information storage unit to store;

a disconnect request accepting unit that accepts a disconnect request from a terminal device whose call state is placed on hold by the holding unit; and a disconnect notifying unit that notifies the second terminal device that the connection to the first terminal device has been disconnected when the disconnect request accepting unit accepts a disconnect request from the first terminal device whose call state is placed on hold by the holding unit, before the device information acquiring unit acquires the device information on the second terminal device.

6. The call control device according to claim 4 which controls call connection between terminal devices via an IP (Internet Protocol) network, wherein the notifying unit notifies the second terminal device that a call request has been accepted using a communication path other than the IP network.

7. The call control device according to claim 1, further comprising:

a state storage unit that stores state information acquired by the state acquiring unit;

an adequacy judging unit that judges, when the state acquiring unit acquires state information, whether or not the acquired state information is appropriate based on the acquired state information and state information already stored in the state storage unit with respect to the terminal device of the acquired state information; and an updating unit that updates, when the adequacy judging unit judges that the acquired state information is appropriate, the state information already stored in the state storage unit to the acquired state information.

8. A call control method using a call control device which controls call connections between a plurality of terminal devices, the call control method comprising:

a call control unit determining, when a call request from a first terminal device to a second terminal device is accepted, whether device information of the second terminal device is stored in a device information storage unit that stores device information on call-connectable terminal devices;

a call control unit holding a call state of the first terminal device when it is determined that device information on the second terminal device is not stored in the device information storage unit;

a call control unit acquiring state information indicating a state of the other terminal device; and a call control unit setting a holding tone to be transmitted to the first terminal device when the acquired state information indicates that the state of the second terminal device is in the process of establishing an Internet Protocol connection, authenticating a Virtual Private Network, or communicating with the call control device.

9. A non-transitory computer-readable storage medium storing a program for a computer which controls call connection between a plurality of terminal devices, the program causing the computer to:

determine, when a call request from a first terminal device to a second terminal device is accepted, whether or not device information on the second terminal device is stored in a device information storage unit that stores device information on call-connectable terminal devices;

hold a call state of the first terminal device when it is determined that the device information on the second terminal device is not stored in the device information storage unit;

acquire state information indicating a state of the second terminal device; and set a holding tone to be transmitted to the first terminal device when the acquired state information indicates that the state of the second terminal device is in the process of establishing an Internet Protocol connection, authenticating a Virtual Private Network, or communicating with the call control device.

* * * * *